US007742845B2

(12) United States Patent
Fink et al.

(10) Patent No.: US 7,742,845 B2
(45) Date of Patent: Jun. 22, 2010

(54) MULTI-AGENT AUTONOMOUS SYSTEM AND METHOD

(75) Inventors: Wolfgang Fink, Montrose, CA (US); James Dohm, Chandler, AZ (US); Mark A. Tarbell, Walnut, CA (US)

(73) Assignee: California Institute of Technology, Pasadena, CA (US)

( * ) Notice: Subject to any disclaimer, the term of this patent is extended or adjusted under 35 U.S.C. 154(b) by 1103 days.

(21) Appl. No.: 11/330,077

(22) Filed: Jan. 10, 2006

(65) Prior Publication Data

US 2006/0229801 A1 Oct. 12, 2006

Related U.S. Application Data

(60) Continuation-in-part of application No. 11/261,549, filed on Oct. 28, 2005, which is a division of application No. 10/625,834, filed on Jul. 22, 2003, now Pat. No. 6,990,406.

(60) Provisional application No. 60/398,052, filed on Jul. 22, 2002, provisional application No. 60/473,726, filed on May 28, 2003.

(51) Int. Cl.
*G06F 19/00* (2006.01)
*G05D 1/00* (2006.01)
(52) U.S. Cl. .............................. 701/2; 701/24; 701/117
(58) Field of Classification Search ........................ None
See application file for complete search history.

(56) References Cited

U.S. PATENT DOCUMENTS

| | | |
|---|---|---|
| 4,887,223 A | 12/1989 | Christian |
| 5,367,457 A | 11/1994 | Ishida |
| 5,458,041 A | 10/1995 | Sun et al. |
| 5,628,033 A | 5/1997 | Dilich et al. |
| 5,781,437 A | 7/1998 | Wiemer et al. |
| 5,911,767 A | 6/1999 | Garibotto et al. |

(Continued)

FOREIGN PATENT DOCUMENTS

JP 11-305360 11/1999

(Continued)

OTHER PUBLICATIONS

Nakamura et al.; Multiple mobile robot operation by human; May 1998; Intl. Conf. on Robotics and Automation, 1998; vol. 4, pp. 2852-2857.

(Continued)

*Primary Examiner*—Michael J. Zanelli
(74) *Attorney, Agent, or Firm*—Christie, Parker & Hale, LLP

(57) ABSTRACT

A method of controlling a plurality of crafts in an operational area includes providing a command system, a first craft in the operational area coupled to the command system, and a second craft in the operational area coupled to the command system. The method further includes determining a first desired destination and a first trajectory to the first desired destination, sending a first command from the command system to the first craft to move a first distance along the first trajectory, and moving the first craft according to the first command. A second desired destination and a second trajectory to the second desired destination are determined and a second command is sent from the command system to the second craft to move a second distance along the second trajectory.

41 Claims, 22 Drawing Sheets

U.S. PATENT DOCUMENTS

| | | | |
|---|---|---|---|
| 5,995,884 | A | 11/1999 | Allen et al. |
| 6,072,524 | A | 6/2000 | Davis et al. |
| 6,438,456 | B1 | 8/2002 | Feddema et al. |
| 6,496,755 | B2 * | 12/2002 | Wallach et al. ............... 700/245 |
| 6,597,143 | B2 | 7/2003 | Song et al. |
| 6,687,571 | B1 * | 2/2004 | Byrne et al. ................. 700/245 |
| 6,694,228 | B2 | 2/2004 | Rios |
| 6,778,097 | B1 | 8/2004 | Kajita et al. |
| 6,811,113 | B1 | 11/2004 | Silansky et al. |
| 2003/0233177 | A1 * | 12/2003 | Johnson et al. ............... 701/23 |
| 2006/0184292 | A1 * | 8/2006 | Appleby et al. ............... 701/23 |
| 2007/0156286 | A1 * | 7/2007 | Yamauchi .................... 700/245 |

OTHER PUBLICATIONS

Chen et al.; Multisensor Based Autonomous Mobile Robot Through Internet Control; Nov. 1997; 23rd Intl. Conf. on Industrial Electronics, Control and Instrumentation; vol. 3, pp. 1248-1253.

Fink et al., Next-generation robotic planetary reconnaissance missions: a paradigm shift, Jul. 2005; Articles in Press, Planetary and Space Science, 8 pages, Elsevier Ltd.

* cited by examiner

MULTI-AGENT AUTONOMOUS SYSTEM AND METHOD

CROSS-REFERENCE TO RELATED APPLICATIONS

This application is a continuation in part of U.S. application Ser. No. 11/261,549, filed on Oct. 28, 2005, which is a division of U.S. application Ser. No. 10/625,834, filed Jul. 22, 2003, now U.S. Pat. No. 6,990,406, which claims the benefit of U.S. Provisional Patent Application No. 60/398,052, filed Jul. 22, 2002 and U.S. Provisional Patent Application No. 60/473,726, filed May 28, 2003, each of which are hereby incorporated by reference as if fully stated herein.

STATEMENT REGARDING FEDERALLY SPONSORED RESEARCH OR DEVELOPMENT

The invention described herein was made in the performance of work under a NASA contract, and is subject to the provisions of Public Law 96-517 (35 U.S.C. 202) in which the contractor has elected to retain title.

BACKGROUND OF THE INVENTION

Robotic reconnaissance operations are called for in potentially hazardous and/or inaccessible situations such as exploration of remote planetary surfaces, military operations, cleanup, mining, rescue operations, oil drilling, and natural terrain or resource exploration. One approach to such operations is to use a few sophisticated, expensive, highly capable and reasoning surface-based reconnaissance crafts (e.g., rovers). In this case the reconnaissance mission is lost or adversely affected when one of the few robotic reconnaissance crafts is damaged or destroyed because there is no redundancy.

In addition, rovers are spatially constrained in that they may only view a small portion of an explored area at a time, they are limited to traversing certain terrains, and they have limited lifetime expectancy in extreme conditions. For example, as most rovers are tracked or wheeled surface-based craft, their elevation above the ground provides only a limited viewing range, and they cannot traverse over topographic highs such as sheer slopes of prominent mountains, canyon walls, cliffs, and topographic lows surrounded by near vertical slopes. Therefore, it is difficult for a rover to view a large enough area to make an intelligent decision about what features in an operational area are worthy of additional investigation, or the rover is constrained to certain terrains that may have limited return of information of special interest, e.g., scientific, industrial, military, rescue, etc.

The spatial constraint of a rover also causes difficulties when planning a path for the rover to follow when traveling through the operational area. As such, the rover may construct a locally optimal path through an operational area but not a globally optimal path because the rover may not be able to view a large enough area. Therefore, the rover may not be able to perform optimal reconnaissance of the features, areas, characteristics, or anomalies of interest.

As an intelligent rover is expensive, both from the perspective of the capital cost to build and the resource cost to deploy and operate, only a single rover is typically deployed within an operational area. This means that any operational area is constrained to an area no larger than what a single rover can explore.

Finally, because the loss of a single rover during an exploration mission may be catastrophic from the perspective of accomplishing the mission goals, there has been reluctance within the robotics community to allow a rover to be truly autonomous. True autonomy means that a rover would be able to make its own decisions about where to go within an exploration space. If the logic controlling the operations of the rover is faulty, and the rover makes a decision that causes it to become inoperable, the mission may be lost. As such, most currently deployed rovers are not truly autonomous as they are at least partially controlled by teleoperation by a human, and thus they conduct point to point reconnaissance rather than investigating and formulating hypotheses while en route, likely missing invaluable information along the constrained path.

Therefore, a need exists for a robotic reconnaissance system that uses various crafts and sensors that are inexpensive enough, both in terms of capital cost and operational resources, so that multiple crafts and sensors can be deployed during a mission. Multiple crafts and sensors provide redundancy in the event a craft or sensor is lost. In addition, multiple crafts and sensors may explore a larger area than a single craft. Finally, as loss of one or more of the multiple crafts or sensors will not destroy a mission, the robotic reconnaissance system may be allowed more autonomy in making decisions about what paths to take while exploring an area.

Algorithms for determining paths for a robot in an accurately characterized environment are well known in the robotics industry. Using these conventional means, the issue of simultaneously commanding and moving even a few deployed reconnaissance agents to their designated destinations becomes exceedingly complex. Each additional simultaneously moving agent increases geometrically the chances of collisions as well as the processing power required for computing and managing the agent trajectories.

Additional complications arise when the operational area in which the agents (e.g., crafts) are moving is not accurately characterized. Even slight errors in slope, mapping, positions and orientation of the agents, or changes in the terrain may result in the agent reaching an entirely different destination than intended. As agents may be moving simultaneously, these changes may also result in collisions that may damage or destroy expensive equipment and lose valuable data collections.

SUMMARY OF THE INVENTION

A method of controlling a plurality of crafts in an operational area includes providing a command system, a first craft in the operational area and coupled to the command system, and a second craft in the operational area and coupled to the command system. The method also includes determining a first desired destination and a first trajectory to the first desired destination, sending a first command from the command system to the first craft to move a first distance along the first trajectory, and moving the first craft according to the first command.

A second desired destination and a second trajectory to the second desired destination are determined, and a second command is sent from the command system to the second craft to move a second distance along the second trajectory.

In one embodiment, a location of the first craft is determined after moving the first craft according to the first command.

In one embodiment, the second craft is moved according to the second command. In one embodiment, the second command is sent after moving the first craft according to the first command. The method may also include determining a location of the second craft after moving the second craft according to the second command.

The first distance may be shorter than a distance of the first trajectory to the first desired destination. The second distance may be shorter than a distance of the second trajectory to the second desired destination.

The first desired destination may be the same as or different from the second desired destination. The command system may be in or outside of the operational area.

In one embodiment, the first craft is at least one of ground-based, subsurface-based, airborne, spaceborne, or waterborne.

One embodiment of the method also includes providing a third craft in the operational area and coupled to the first craft, the second craft, or both. A third desired destination and a third trajectory to the third desired destination are determined and a third command can be sent from the first craft, the second craft, or both to the third craft to move a third distance along the third trajectory. The third craft is then moved according to the third command.

In several embodiments, a third trajectory is determined. The third trajectory may be the same as the first trajectory or different. The determining of the third trajectory may be based on the determined location of the first craft, another desired destination, detection of a characteristic, or an anomaly. The detection of the characteristic may be by the crafts or the command system, and may be spatial or temporal. Examples of spatial characteristics are location of the crafts, features of the operational area, features of an object in the operational areas, movement, etc. Examples of temporal characteristics are a duration of movement or a particular, predetermined time for recalculation. An anomaly is determined by comparison of data sensed by the crafts or command system with a stored dataset. Examples of an anomaly are an object unique to the operational area or a transient event.

The first craft can then be commanded to move a third distance along the third trajectory.

One embodiment includes sensing of the operational area by the first craft to obtain sensing information and transmitting the sensing information to the command system. A third trajectory for the first craft can also be determined by the command system at least in part based on the sensing information. A third command can then be sent to the first craft to move a third distance along the third trajectory.

BRIEF DESCRIPTION OF THE DRAWINGS

These and other features, aspects, and advantages of the present invention will become better understood with regard to the following description, appended claims, and accompanying drawings where:

DETAILED DESCRIPTION

Figure 1A:
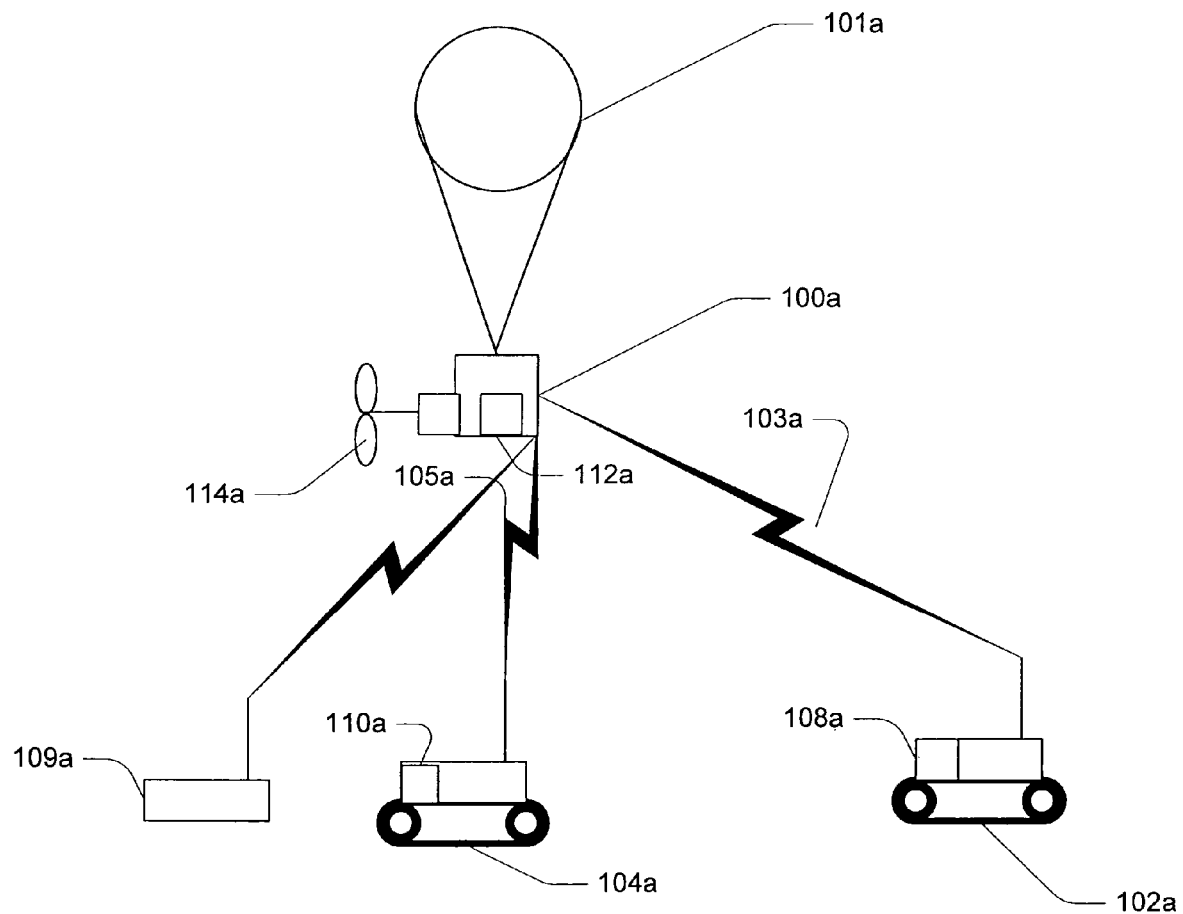
FIG. 1a is a block diagram of a multi-agent autonomous system in accordance with an exemplary embodiment of the present invention.

A multi-agent autonomous system includes numerous and redundant, specialized, low cost, expendable, sensor-equipped, self-propelled reconnaissance crafts, landers, and/or immobile agents (e.g., sensors of diverse types, sizes, and shapes), that collectively can perform tier-scalable reconnaissance of vast expanses of terrain in a relatively short amount of time. Furthermore, in utilizing an overhead view, several significant mission advantages emerge, such as: enhanced craft safety (e.g., cliffs are visible long before the rover arrives there); more efficient air-controlled path planning for crafts, thus increased mission science return; and enhanced control of craft traverses in unknown terrain.

Integrated multi-tiered, multi-agent autonomous remote planetary surface and subsurface exploration allows truly autonomous science exploration missions with, for example, air and ground-based agents in real environments. Furthermore, an overhead perspective allows for unprecedented safety of surface-based craft, i.e., non-traversable terrain (e.g., cliffs) is detected long before a surface-based craft arrives there. Also, the overhead view allows for much more efficient path planning and location tracking of the ground-based craft simply because more terrain is visible. This is particularly important when a surface-based craft leaves an operational area that was imaged during a descent onto a planetary surface or operates in rugged terrain where field of view is restricted. Optimized path planning leads to increased mission objective return. The advantage of having an overhead view reduces drastically the planning effort necessary to navigate the surface-based craft and thus allows for commanding multiple surface-based crafts with almost no additional effort, as well as deployment of surface-based crafts and immobile crafts (e.g., sensors, drill rigs, etc.) to identified targets of interest.

Although embodiments of the invention will be discussed mainly in the context of surface-based crafts, it is also within the scope of the invention for the crafts to be subsurface-based, airborne, spaceborne, waterborne, or any combination of these. For example, the crafts may be airborne in any type of atmosphere, may be dropped onto the ground surface, and maneuver toward a body of water, to float on its surface or submerge below its surface to explore its depths or to move on the floor of the body of water (e.g., ocean floor). In another embodiment, they could drop onto the ground surface and drill into the subsurface to explore its depths (e.g., ice or soil drilling).

The multi-agent autonomous system can be applied to a variety of missions, such as: mine-sweeping operations; clean-up operations in hazardous environments (e.g., chemical plants, nuclear plants, etc.); scientific operations such as sample detection and sample return (e.g., search for meteorites in Antarctica or exploration of a volcano, exotic mineral, and/or life on Earth and beyond); military reconnaissance operations in hostile environments; rescue operations in catastrophe-impacted areas; and industrial mining or oil drilling operations.

FIG. 1a is a block diagram of a multi-agent autonomous system in accordance with an exemplary embodiment of the present invention. A multi-agent autonomous system includes an airborne tracking and command system 100a that may be held aloft by a support platform such as a lighter-than-air aircraft or balloon 101a. The tracking and command system is in communication with one or more surface-based craft or agents, such as craft 102a and 104a, as well as immobile landers, drill rigs, or sensors such as 109a. Communications may be accomplished by radio control communications links 103a and 105a.

Each craft or lander includes an instrument suite, such as instrument suites 108a and 110a that are used by the craft to obtain information about an environment or operational area in which the crafts are deployed. For example, the instrument suite may include an optical camera for taking images of an area immediately around each of the crafts. Other imaging systems and instruments may be employed as well. For example, the crafts may include sensors for detecting a wide variety of data, such as geochemical, geophysical, stratigraphic, tectonic, spectral, elemental, geomorphic, pedologic, biologic, hydrologic, geologic, topographic, climatologic, seismic, and acoustical information. Sensors may, for example, detect pressure, temperature (thermal), atmospheric conditions, subsurface information, radioactivity, the presence of moisture or water, etc.

The sensor signals containing sensing information from the instrument suite are transmitted by the craft or lander to the tracking and command system.

The tracking and command system includes its own instrument suite 112a. The tracking and command system uses its instrument suite to take sensor readings of the craft and the environment surrounding the craft. For example, the tracking and command system's instrument suite may include an operational area imager such as an optical camera for capturing images of the craft environment and the craft within the environment. The tracking and command system may also include any other type of sensor, as described above.

In operation, the tracking and command system receives signals from its instrument suite including environment and craft signals indicating the position and heading of each craft in the environment. The tracking and command system uses the signals to generate a set of craft movement commands that are transmitted to the craft. The crafts respond to the craft movement command signals by moving in the commanded manner through the environment. The tracking and command system also generates craft command signals commanding the crafts to employ their own instrument suites to investigate objects or targets within their environment.

As the tracking and command system in this embodiment is airborne above the craft environment, the tracking and command system has a much larger field of view than the craft. As such, the tracking and command system may detect various obstacles and targets, characteristics, or anomalies in the environment that the surface-based craft may not be able to detect. By having a larger field of view of the environment, the tracking and command system may select targets for exploration by the crafts that the surface-based crafts are unable to select simply because the surface-based crafts cannot detect the potential target in the first place. In addition, the tracking and command system may use its larger field of view to more accurately determine a path for each craft around obstacles in the craft's environment.

As discussed above, the tracking and command system may alternatively be spaceborne, waterborne, ground-based, or subsurface. For example, a spaceborne command system, such as an orbiting space craft has a global view, improving the detection of transient events, such as the release of a plume of methane, volcanic eruption, seep of water, deployment of troops, etc. Spacecraft can also continuously observe a locale/target. Similarly, a waterborne command system, such as a ship, can view the subsurface body of water and direct submarines and ocean floor rovers.

The broader field of view of the tracking and command system is not limited to an overhead view, but may be an upward, sideways, or any other orientation having a greater field of view than the crafts. For example, the tracking and command center could be on the ground looking up to navigate and control several airships or planes, or shoot down missiles with a ground-based laser. A sideways scenario could be the deployment of troops and tanks in a battle field where everything, including the tracking and command center are ground-based in one plane.

Referring again to FIG. 1a, the aircraft supporting the tracking and command system may further include a thrust generating element 114a for maneuvering the aircraft. Maneuvering the aircraft may be useful for both ensuring the aircraft remains in a desired area or for moving the multi-agent autonomous system to a new operational area. In addition, various forms of aircraft may be used as a platform for the tracking and command system. For example, the aircraft may be some other type of lighter-than-air aircraft such as a blimp. The aircraft may also be a heavier-than-air aircraft such as a glider, airplane, or helicopter.

In another tracking and command system support platform in accordance with an exemplary embodiment of the present invention, the platform is a tethered lighter-than-air aircraft. The aircraft may be tethered either directly to the surface, and thus fixed in place, or may be tethered to one of the surface-based craft. If tethered to one of the surface-based craft, the support platform and tracking and command system may travel to different locations along with the surface-based craft.

In another embodiment, the deployed agents may include one or more non-mobile sensors or landers, such as sensor 109a, that are not self-propelled. These additional sensors may be used to augment or replace the surface-based information collected by the mobile surface-based craft.

Figure 1B:
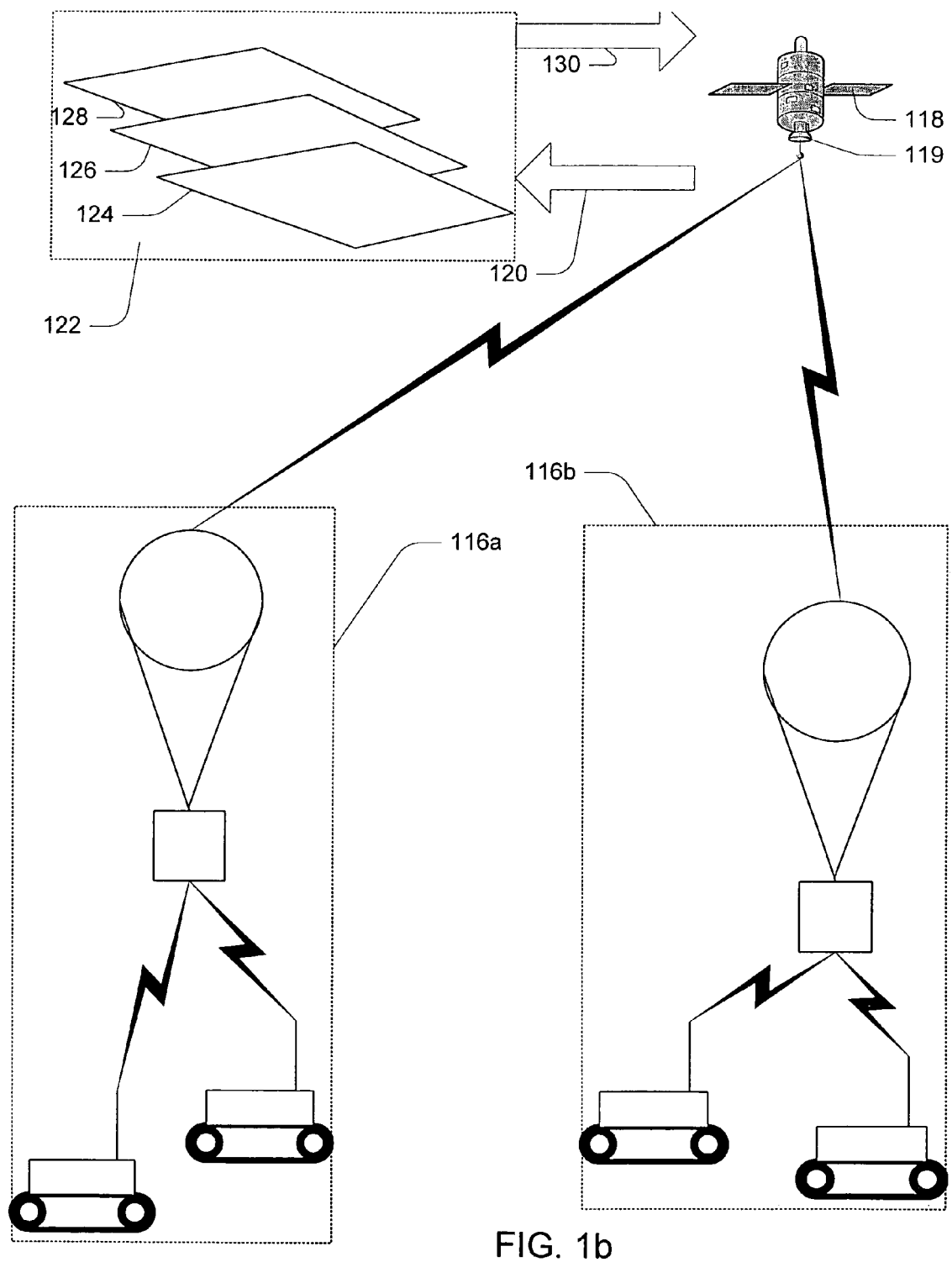
FIG. 1b is a block diagram illustrating the use of a multi-agent autonomous system to explore an operational area in accordance with an exemplary embodiment of the present invention.

FIG. 1b is a block diagram illustrating the use of a multi-agent autonomous system to explore an area in accordance with an exemplary embodiment of the present invention. One or more multi-agent autonomous systems, such as multi-agent autonomous systems 116a and 116b, may be coupled to a satellite 118 for exploration of a large area. The satellite may include its own instrument suite 119 for imaging the area being explored by the multi-agent autonomous systems. Information collected by the multi-agent autonomous systems and the satellite using its instrument suite is integrated 120 to generate a database (Multi-Layer Information System (MLIS)) 122 including views of the explored area generated by the various components of the exploration system. For example, information supplied by the surface-based craft 124 may include the detailed images of an operational area. However, since the surface-based craft have only a limited view, the actual area imaged by the surface-based craft may be small.

Information supplied by the airborne tracking and command systems 126 may include images of a large portion of the explored area. However, as the airborne tracking and command systems are more elevated and further away from the explored area with respect to the surface-based craft, the information supplied by the tracking and command systems may be less detailed than the information collected by the surface-based craft. Information supplied by the satellite may include images from the entire explored area, but may not be as detailed as the information supplied by the tracking and command systems. By combining information from the components of the exploration system, a large area may be explored with a high level of detail.

Portions of the database of information may be transmitted 130 to the satellite and distributed to the coupled multi-agent autonomous systems. In this way, a multi-agent autonomous system may use information collected by the satellite or another autonomous system to aid in selection of targets to be explored by the surface-based crafts.

Figure 2:
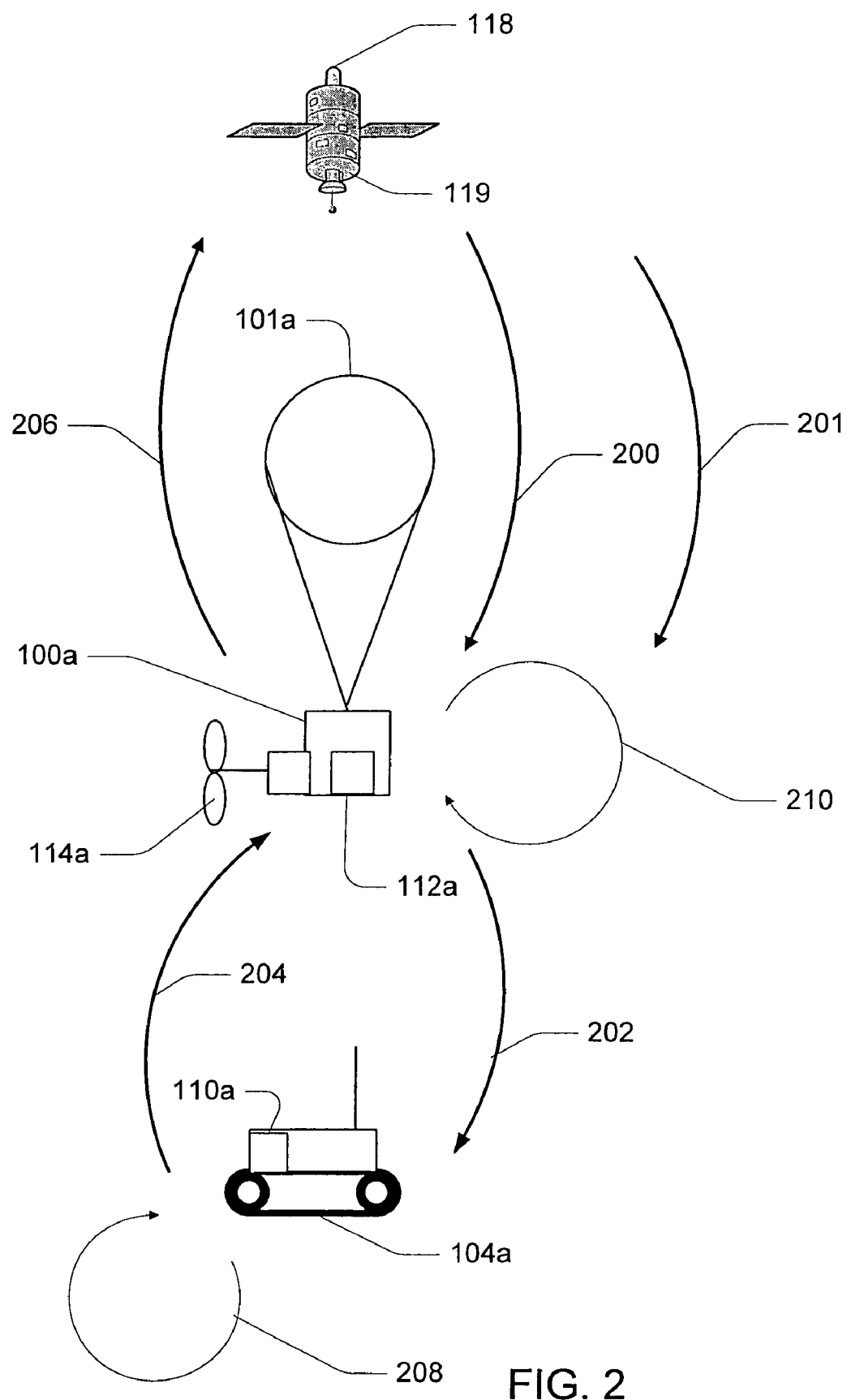
FIG. 2 is a block diagram illustrating communication links within a multi-agent autonomous system in accordance with an exemplary embodiment of the present invention.

FIG. 2 is a block diagram illustrating communication links within an exploration system using a multi-agent autonomous system in accordance with an exemplary embodiment of the present invention. A tracking and command system 100a receives an initiation signal 200 from a satellite 118. The tracking and command system may also receive information 201 about an area to be explored, such as images generated by the satellite's instrument suite 119. In response to the initiation signal, the tracking and command system uses its own instrument suite 112a to image the area to be explored. The tracking and command system uses the information received from the satellite and its own imaging information to identify targets and obstacles in the area to be explored. Once the targets and the objects have been identified, the tracking and command system generates a path or trajectory for a craft 104a to follow to get from the craft's current position to a target while avoiding any obstacles. The tracking and command system uses the path to generate and transmit craft command signals 202 to the craft. The craft responds to the command signals until it reaches a target. At the target, the craft uses its own instrument suite 110a to collect surface-based information about the target. The craft transmits the information about the target 204 to the tracking and command system or directly to the spaceborne tracking and command system. The tracking and command system in turn transmits its own imaging information as well as the craft's surface-based target information 206 to the satellite for integration into a database (MLIS) as previously described.

In addition to collecting information about targets and responding to craft commands from the tracking and command system, the craft may also use internal control logic to internally manage (208) collision avoidance. For example, the craft may include proximity sensors used to detect objects or other craft in its immediate vicinity. By using signals generated from the proximity sensors, the craft may avoid collisions with objects that the tracking and command system may not be able to detect. In a similar manner, the tracking and command system may generate (210) its own navigational commands in order to travel to a new area for exploration or maintain its position within an area of exploration. The spaceborne tracking and command system may deploy sensors to determine atmospheric and ground conditions (e.g., within the canyon system of Valles Marineris) for further deployment of airborne and ground-based crafts.

As depicted, the multi-agent autonomous system is a multilayered and hierarchical system. For example, the surface-based crafts constitute one layer, the tracking and command system constitutes another layer, and the satellite constitutes yet another layer. Each layer or tier, in this embodiment, provides both information input from specific instrument suites and also includes computational elements. The exact distribution of the instrument suites, computational elements, and even the number of layers may be altered. For example, an extra airborne layer or subsurface layer may be added to command the tracking and command system to relocate. In addition, the computations performed by the tracking and command system may be performed by, for example, a surface-based craft or base station. Finally, the satellite may be used to track and command the surface-based craft without having an intervening airborne instrumented or processing element (e.g., on planetary bodies such as the Moon that lack an atmosphere).

Figure 3:
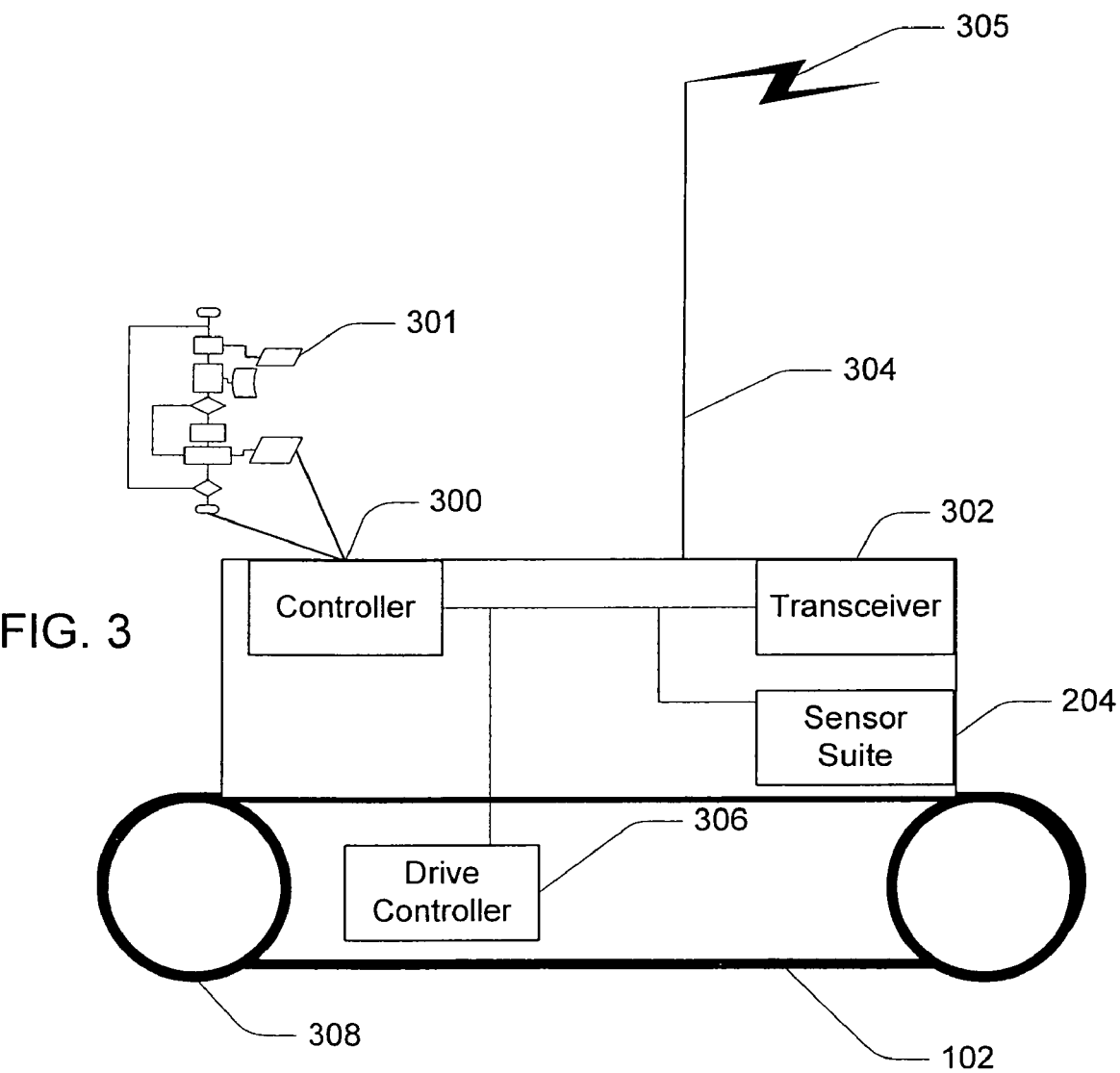
FIG. 3 is a block diagram of an agent or craft in accordance with an exemplary embodiment of the present invention.

FIG. 3 is a block diagram of a surface-based agent or craft in accordance with an exemplary embodiment of the present invention. A craft 102 includes a controller 300 having programming instructions 301 for controlling the operation of the craft. The controller is coupled to a transceiver 302 and antenna 304 for receiving and transmitting signals 305 from a tracking and command system. The controller is further coupled to an instrument suite 204 (or "sensor suite") used to analyze the craft's environment. The sensor suite may include, for example, imaging sensors such as video cameras for capturing images of the environment for transmission to the tracking and command system. Any type of sensor or sampling mechanism (e.g., a robotic arm with a drill, a chemical analysis unit, etc.) may also be included in the craft's sensor suite for obtaining information and samples to be stored or transmitted to the command system.

The instrument suite may further include proximity sensors used to sense objects or other craft in the immediate vicinity of the craft. The craft's controller may be programmed to use signals received from the proximity sensors to avoid collisions with obstacles or other craft.

The controller is further coupled to a drive controller 306 used to operate the craft's drive mechanism 308. In one craft in accordance with an exemplary embodiment of the present invention, the surface-based craft includes a tread drive mechanism. In other crafts, the drive mechanism may include wheels, legs operable to move the craft, surface effect drives, appendages for climbing cliffs, etc. In addition, the surface-based craft may be operable on the surface of or within a body of water. Such a craft may be amphibious or be a boat, ship, or submarine.

In one multi-agent autonomous system in accordance with an exemplary embodiment of the present invention, an individually addressable Radio Controlled (R/C) robot unit is used as a surface-based craft. One such robot unit is supplied by Plantraco Ltd. of Saskatoon, Canada, and is known as a "Telecommander Desktop Sciencecraft" or "Desktop Rover".

Each Telecommander Desktop Sciencecraft system includes a sciencecraft unit and a Universal Serial Bus (USB)-controlled R/C commanding unit. A tracking and command system issues commands to the deployed sciencecraft via the USB-connected R/C control unit. Each sciencecraft operates on a unique R/C frequency.

In addition, the Telecommander Desktop Sciencecraft contains an integrated onboard color video camera. When the sciencecraft arrives at a destination, it can relay in-situ images of the target back to the tracking and command system for science analysis.

Although the Telecommander Desktop Sciencecraft system may be used effectively in some operational areas, one skilled in the art will understand that any craft suitable for the desired reconnaissance and exploration mission may be used, and modifications to be made to the crafts according to the desired mission will be readily understood to those skilled in the art.

Figure 4:
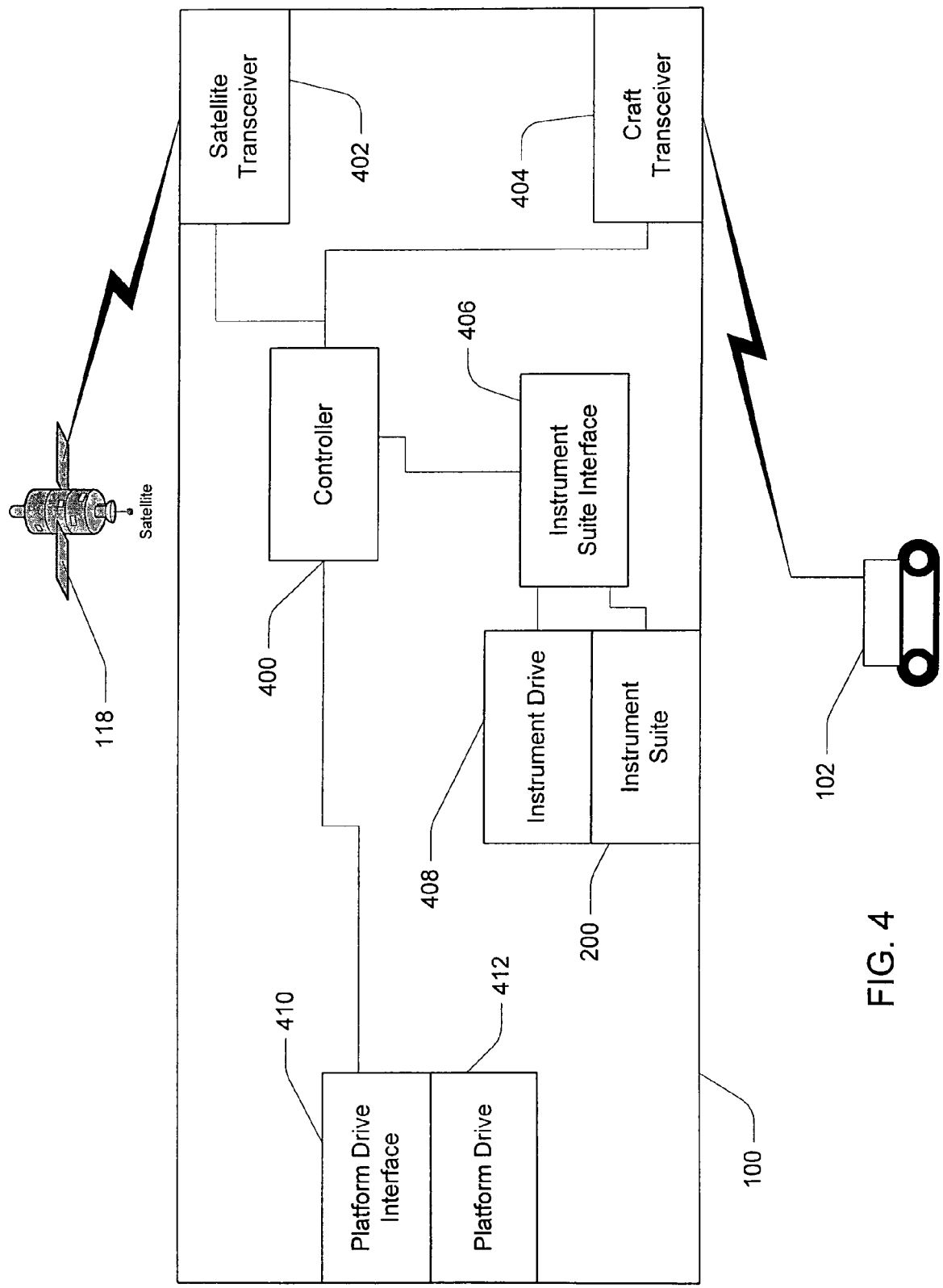
FIG. 4 is a block diagram of a craft tracking and command system in accordance with an exemplary embodiment of the present invention.

FIG. 4 is a block diagram of a craft tracking and command system in accordance with an exemplary embodiment of the present invention. A tracking and command system 100 includes a controller 400 for controlling the operations of the tracking and command system. The controller is coupled to a satellite transceiver 402 for communicating with a satellite 118. The controller is further coupled to a craft transceiver 404 used to communicate with a surface-based craft 102. The controller is further coupled to an instrument suite interface 406. The controller uses the instrument suite interface to control the operations of an instrument drive 408 coupled to an instrument suite 200. The instrument drive may be used to aim, focus, and adjust the magnification of imaging sensors such as optical cameras, or any other type of sensor. The instrument suite is electrically coupled to the instrument suite interface for use by the controller in collection of information used by the tracking and command system to track the surface-based craft and generate paths for the surface-based craft.

If the tracking and command system is mounted on a platform that is capable of transporting the tracking and command system between operational areas, the controller is further coupled to a platform drive interface 410. The platform drive interface is further coupled to a platform drive mechanism 412.

Figure 5:
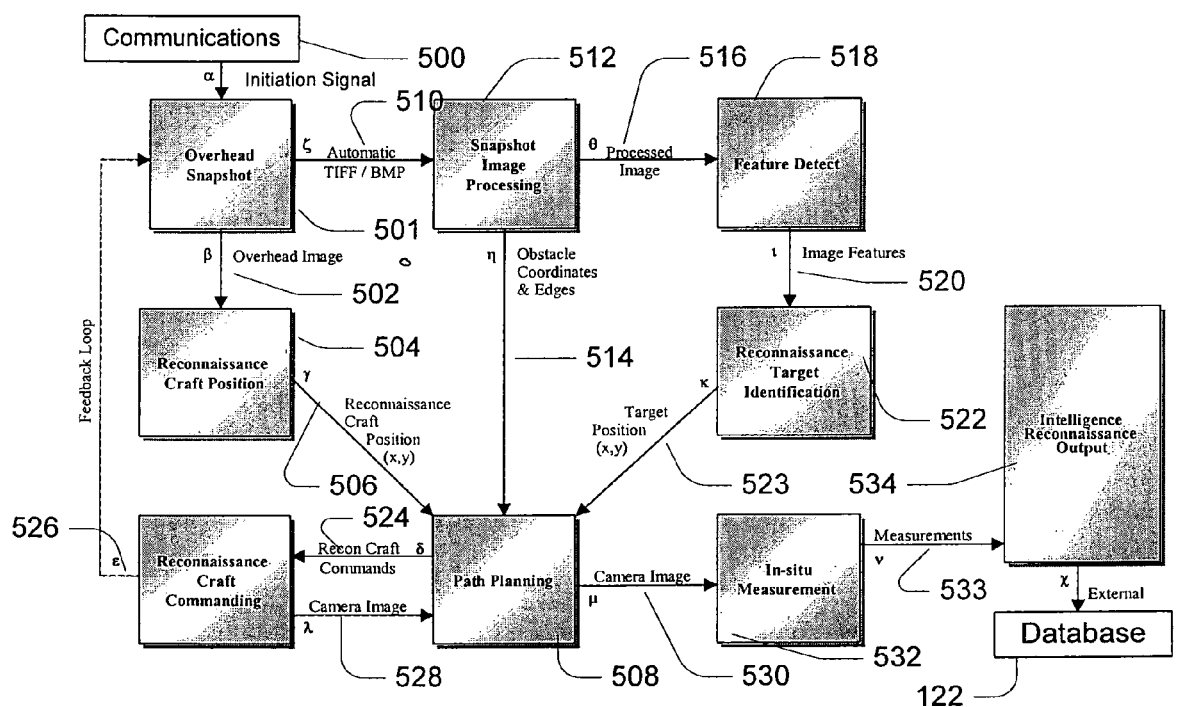
FIG. 5 is a software module diagram of a multi-agent autonomous system in accordance with an exemplary embodiment of the present invention.

FIG. 5 is a software module diagram of a multi-agent autonomous system in accordance with an exemplary embodiment of the present invention. The tracking and command system includes a communications module 500 for receiving commands from a satellite or other external system. Once an initiate signal is received, the tracking and command system uses an overhead image capturing module 501 to capture an image of an operational area. The image 502 is transmitted to a reconnaissance craft position module 504. The reconnaissance craft position module uses the image to determine the location and heading 506 of a surface-based craft in the area of operation. The image is further used by an imaging processing module 512 to identify any obstacles that may be in the area to be explored by generating a set of obstacle coordinates and outlines or edges 514.

A processed image 516 from the image processing module is transmitted to a feature detection module 518. The feature detection module uses the processed image to demark image features 520 that are transmitted to a reconnaissance and target identification module 522. The reconnaissance and target identification module identifies features of interest in the operational area. Those features of highest interest are identified as targets and a set of target positions 523 is generated.

Examples of suitable detection modules and reconnaissance and target identification modules are discussed in, for example, Fink et. al, *AGFA: (Airborne) Automated Geologic Field Analyzer*, Symposium SS-56: "New results from the robotic exploration of Mars and Titan and their implications on planetary environmental conditions and cosmochemistry", Abstracts of the 15$^{th}$ Annual V. M. Goldschmidt Conference, Moscow, Id. Geochimica et Cosmochimica Acta, Volume 69, Number 10S, A535 (2005), which is incorporated by reference in its entirety herein.

A path planning module 508 receives the reconnaissance craft location information 506, the obstacle location and edge information 514, and target positions 523. The path planning module uses this information to plan a path for the craft and generate a set of craft commands 524. The tracking and command system then uses a craft communication module to transmit the craft commands to a craft.

The craft communication module is also used to receive transmissions from a craft. The transmissions may include information collected by the craft using the craft's own instrumentation suite, such as a camera image 528. This information is provided to the path planning module along with the information taken from the tracking and command system. The path planning module may use the craft instrument suite information to further refine the craft commands to be sent to the craft.

The software modules continuously process information received from the tracking and command system instrument suite and the craft instrument suite as indicated by feedback loop 526. This generates a constant stream of craft commands that are transmitted to the surface-based craft as they travel within the operational area.

The path planning module forwards the craft's instrument suite information 530 to an in-situ measurement module 532. The in-situ measurement module analyzes the information received from the surface-based craft and forwards the resultant measurements 533 to an intelligence reconnaissance output module 534. The intelligence reconnaissance output module transmits the craft information to external entities for integration into a previously described database 122 (MLIS) (of FIG. 1b).

Figure 6:
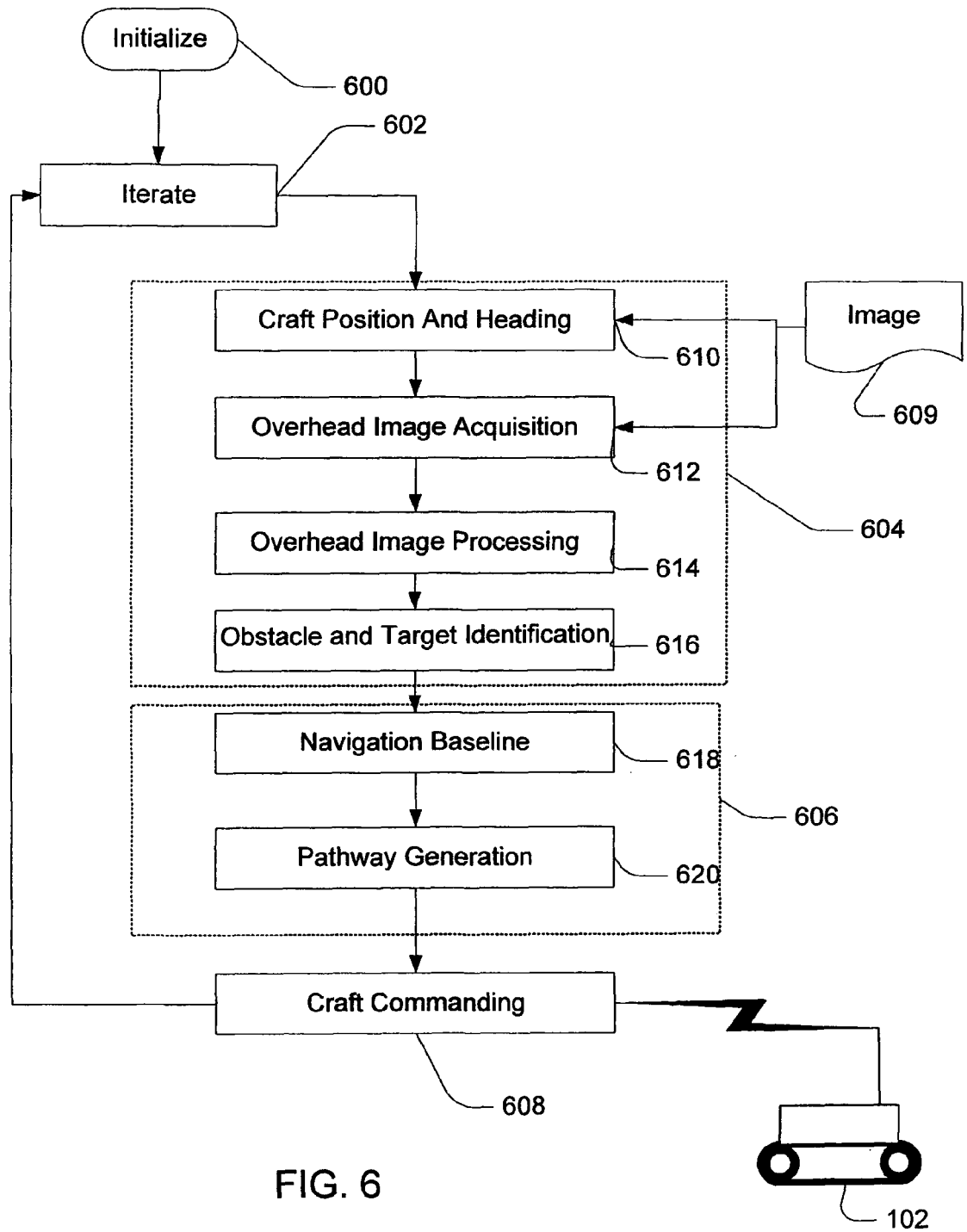
FIG. 6 is a process flow diagram for a multi-agent autonomous system in accordance with an exemplary embodiment of the present invention.

FIG. 6 is a process flow diagram for a multi-agent autonomous system in accordance with an exemplary embodiment of the present invention. The process flow diagram illustrates the processing sequence of the software modules of FIG. 5. A tracking and command system receives an exploration initiation signal 600 and iterates (602) the following sequence of operations. In a science and imaging process phase 604, the tracking and command system collects images about an operational area including surface-based craft deployed in the operational area. In a craft path determination phase (606) the tracking and command system determines a pathway to be followed by a craft in the operational area. In a craft command phase (608), the tracking and command system commands a craft 102 in such a way that the craft moves along a designated path between obstacles and towards a target. The process repeats iteratively 602 such that the craft follows a pathway to a target location.

In slightly more detail, the science and imaging process phase further includes receiving an image 609 of an operational area including images of any craft deployed in the operational area. The tracking and command system determines (610) from the image the location and heading of any craft in the operational area. The tracking and command system also acquires (612) the image and processes (614) the image to determine (616) obstacles and targets within the operational area.

During the craft path determination phase, the tracking and command system uses the obstacles, targets, and crafts' current positions to determine (618) a navigation baseline for each craft deployed in the operational area. The tracking and command system then generates (620) a pathway or trajectory for each craft to follow so that the craft may avoid the identified obstacles and reach a target.

Figure 7A:
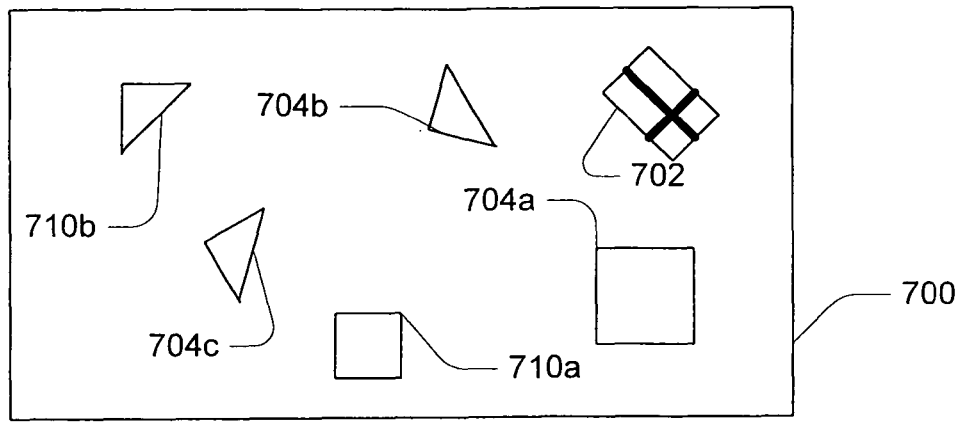
FIG. 7a is a block diagram of a craft imaged in an environment by a craft tracking and command system in accordance with an exemplary embodiment of the present invention.

FIG. 7*a* is a semi-schematic drawing of a craft imaged in an environment by a craft tracking and command system in accordance with an exemplary embodiment of the present invention. The image 700 includes an image taken of a craft 702. The craft includes markings or other indicia that are visible to the tracking and command system's instrument suite. The markings may be used by the tracking and command system to determine a craft's heading. The image further includes images of obstacles, such as obstacles 704*a*, 704*b*, and 704*c*, that may impede the progress of the craft as the craft moves around within the imaged area. The image further includes images of targets, such as 710*a* and 710b, that the tracking and command system may determine are of interest. The tracking and command system will use the image to determine a path for the craft to take to reach the targets while avoiding the obstacles.

Figure 7B:
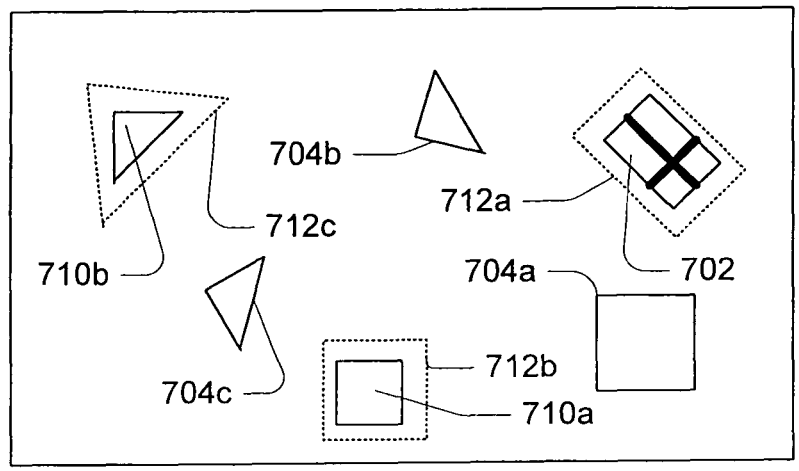
FIG. 7b is a block diagram of a craft, targets, and obstacles identified in an environment by a craft tracking and command system in accordance with an exemplary embodiment of the present invention.

FIG. 7*b* is a semi-schematic drawing of a craft, targets, and obstacles identified in an environment by a craft tracking and command system in accordance with an exemplary embodiment of the present invention. The tracking and command system identifies the craft 702 in the image by extracting features from the image and analyzing the features. Once the tracking and command system has identified the craft, as exemplified by the box 712*a*, the tracking and command system can determine the craft position. In addition, the tracking and command system uses the indicia on the craft to determine the heading of the craft.

The tracking and command system also separates other features within the image into obstacles and targets. A target may be separated from an obstacle by considering a feature space including the object's size, shape, albedo, surface irregularities, etc. Once an object has been identified as a target, as exemplified by box 712*b* around target 710*a*, the tracking and command system can determine the target's position. The tracking and command system continues processing features in the image to identify other targets, such as target 710*b*, as exemplified by triangle 712*c*. Other features identified by the tracking system, such as features 704*a*, 704*b*, and 704*c*, are identified as obstacles to be avoided by the craft.

Figure 7C:
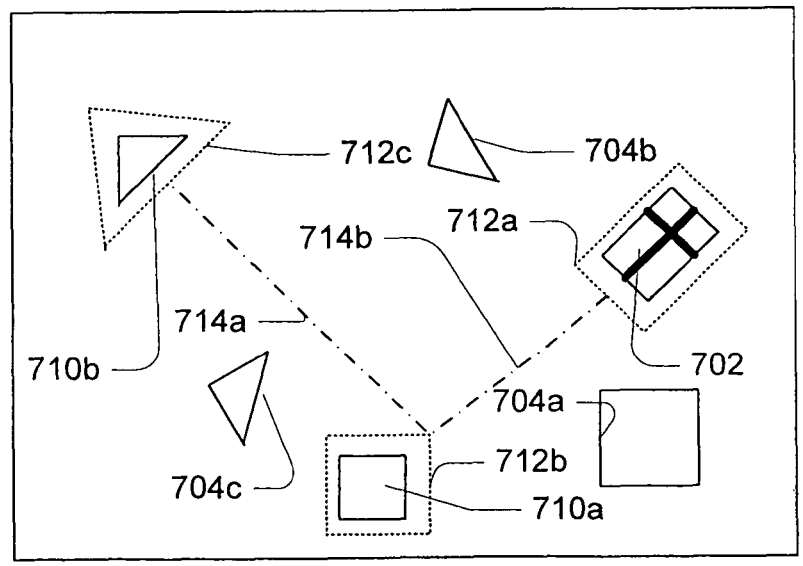
FIG. 7c is a block diagram of a planned craft path in accordance with an exemplary embodiment of the present invention.

FIG. 7*c* is a semi-schematic drawing of a planned craft path in accordance with an exemplary embodiment of the present invention. The craft is commanded by the tracking and command system to travel through the imaged operational area through a sequence of moves. For example, the craft 702 may be commanded to rotate a specified number of degrees in order to adjust its heading so that the craft is pointed toward its next target 710*a*. The craft is then commanded to travel a certain distance along its path, thus defining a segment 714*b* of a path. The path segment avoids obstacles 704*a* and 704*b* and takes the craft to its first target. The path segment may also take the craft part of the way to its first target along a particular trajectory. The craft may then be commanded to move the rest of the way to its target along the same trajectory.

When the craft arrives at the first target, it proceeds to analyze the target, and transmits analysis data to the tracking and command system. The craft is then commanded to rotate and travel along path segment 714*a* to a second target 710*b*, while avoiding obstacle 704*c*. In this way, the craft is commanded to travel throughout an operational area, traveling from target to target without becoming obstructed by an obstacle. As the tracking and command system has information about a large area, it may intelligently command a craft through the large area without placing the craft into an untenable position. Furthermore, the tracking and command system may command a craft along an optimized trajectory through the large area.

Figure 8:
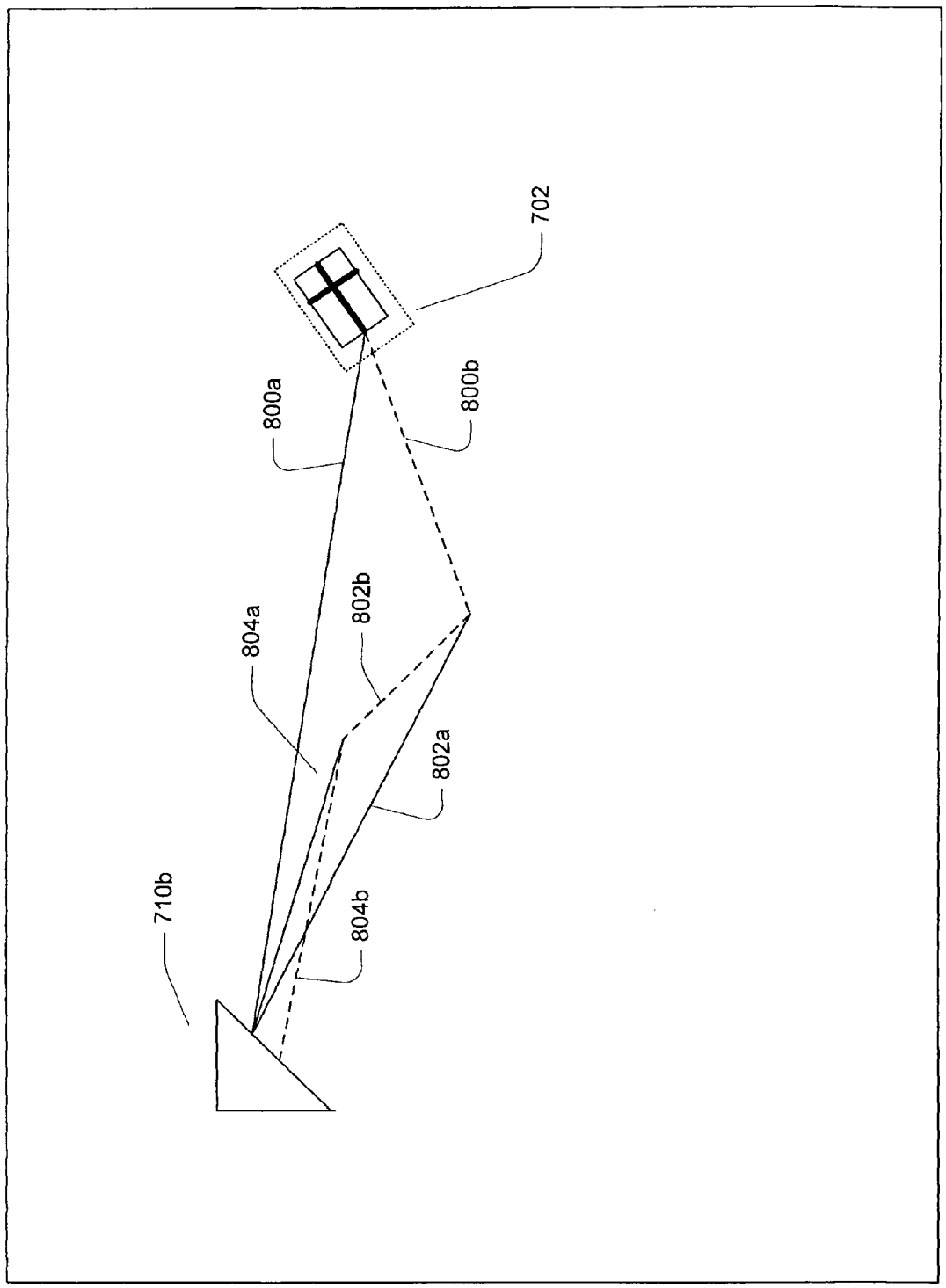
FIG. 8 is a block diagram depicting an iterative path planning sequence in accordance with an exemplary embodiment of the present invention.

FIG. 8 is a semi-schematic drawing depicting an iterative path planning sequence in accordance with an exemplary embodiment of the present invention. A craft 702 may be commanded to pass through an area to target 710*b*. As the tracking and command system may take a sequence of images in order to command the craft, the tracking and command system may issue a sequence of craft commands adjusting the craft's path through the environment in incremental steps. In this way, the multi-agent autonomous system may correct any errors that occur in the craft's progress. For example, the tracking and command system may command the craft to travel along path segment 800*a*. The tracking and command system issues a rotation command and a move forward command to the craft. As the craft moves forward, it may deviate from the desired path as indicated by segment 800*b*. In subsequent iterative steps, the tracking and command system takes images of the operational area and calculates additional segments for the path. For example, the tracking and command system may command the craft to rotate and follow path segment 802*a* only to discover that the craft has traveled along path segment 802*b*. Upon each iteration, the tracking and command system may issue commands guiding the craft along successive segments, such as 800*a*, 802*a*, and 804*a*, each time correcting the path of the craft when the tracking and command system determines that the craft has actually traveled along other path segments, such as 800*b*, 802*b*, and 804*b*. Thus, through successive craft commands, the tracking and command system guides the craft along successive path segments, resulting in the craft arriving at the desired target 710*b*.

Figure 12A:
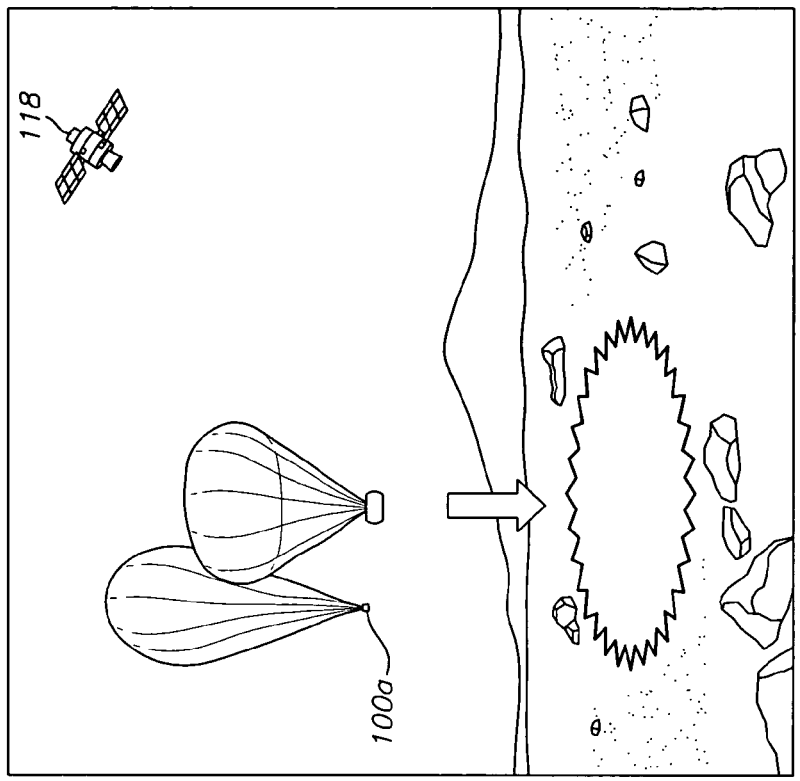
FIGS. 12a-12q are perspective views showing stages in one embodiment of a craft command process according to the present invention.
Figure 12B:
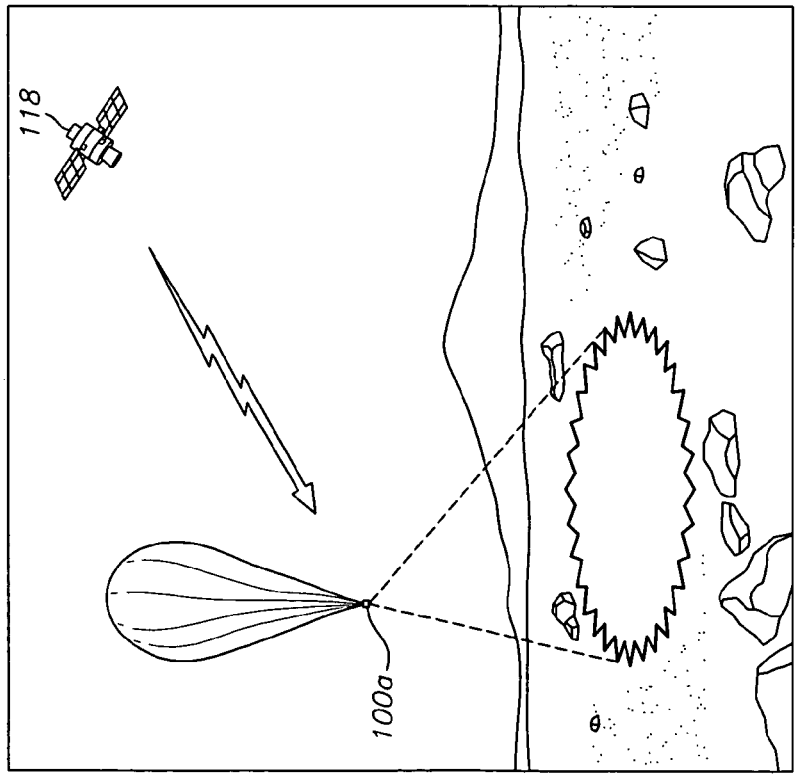
Figure 12D:
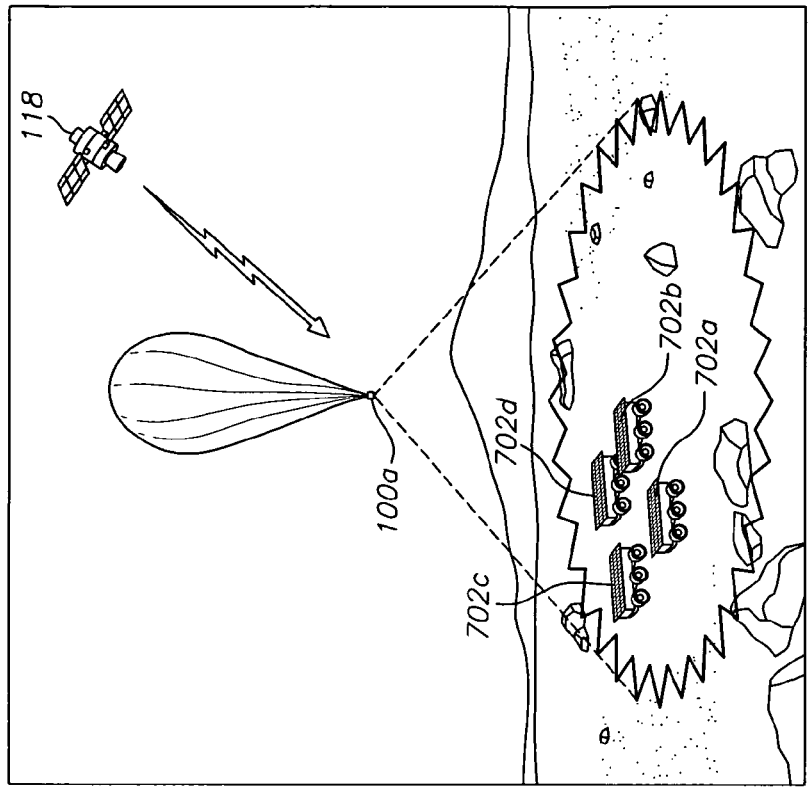
Figure 12C:
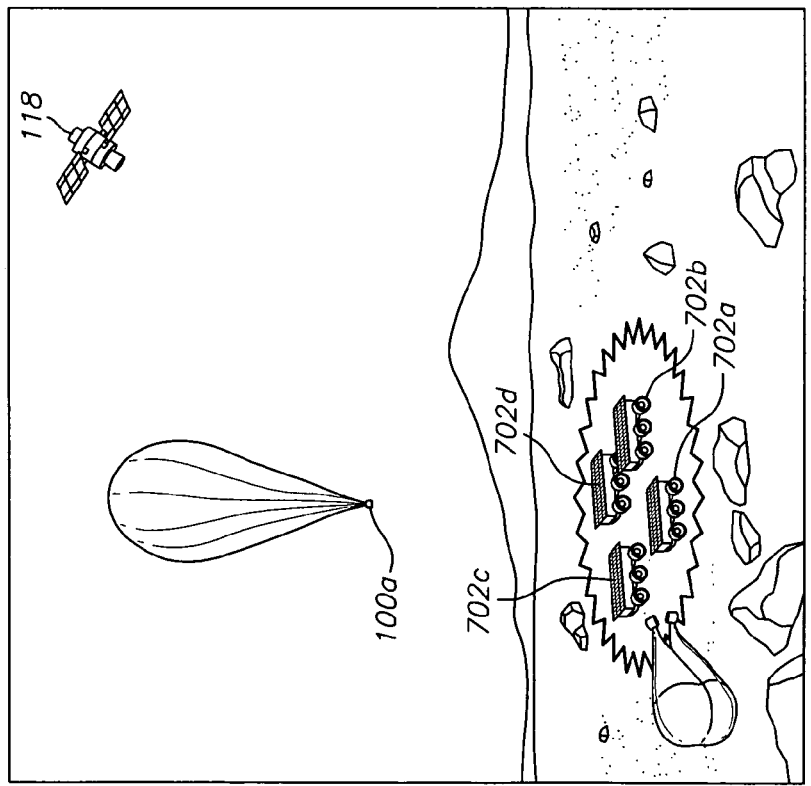
Figure 12F:
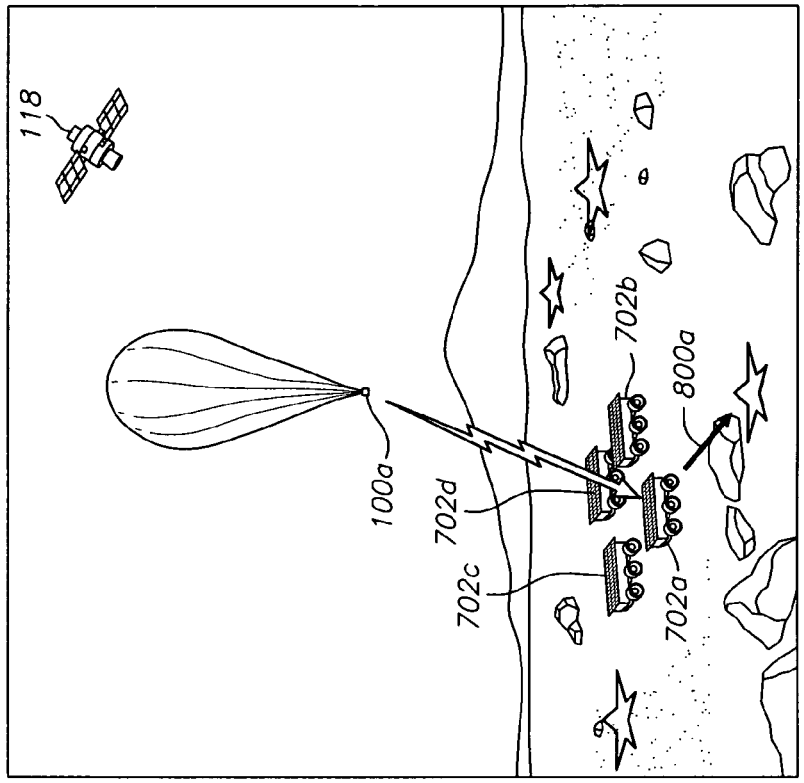
Figure 12E:
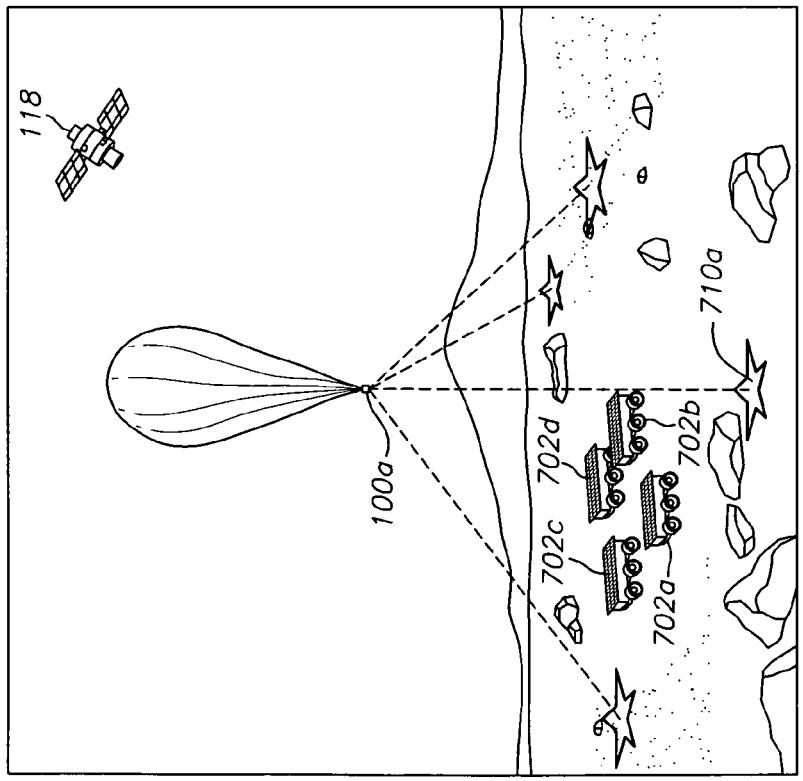
Figure 12H:
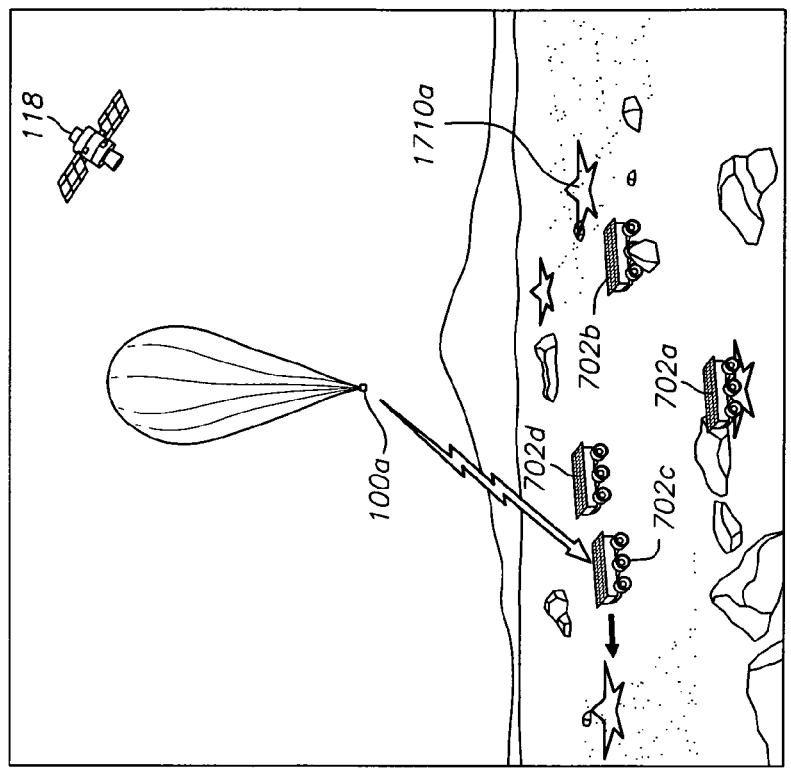
Figure 12G:
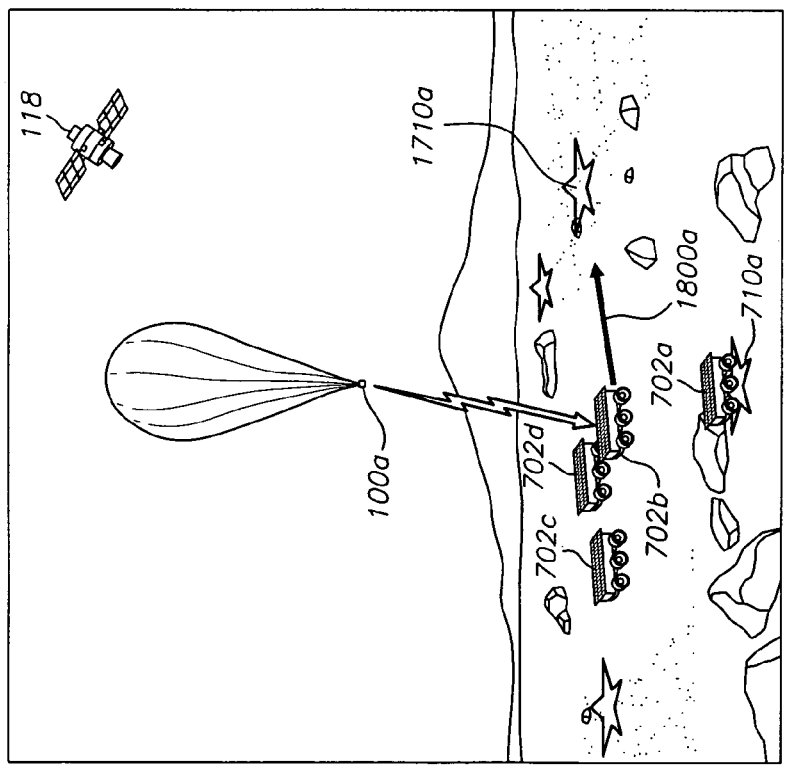
Figure 12J:
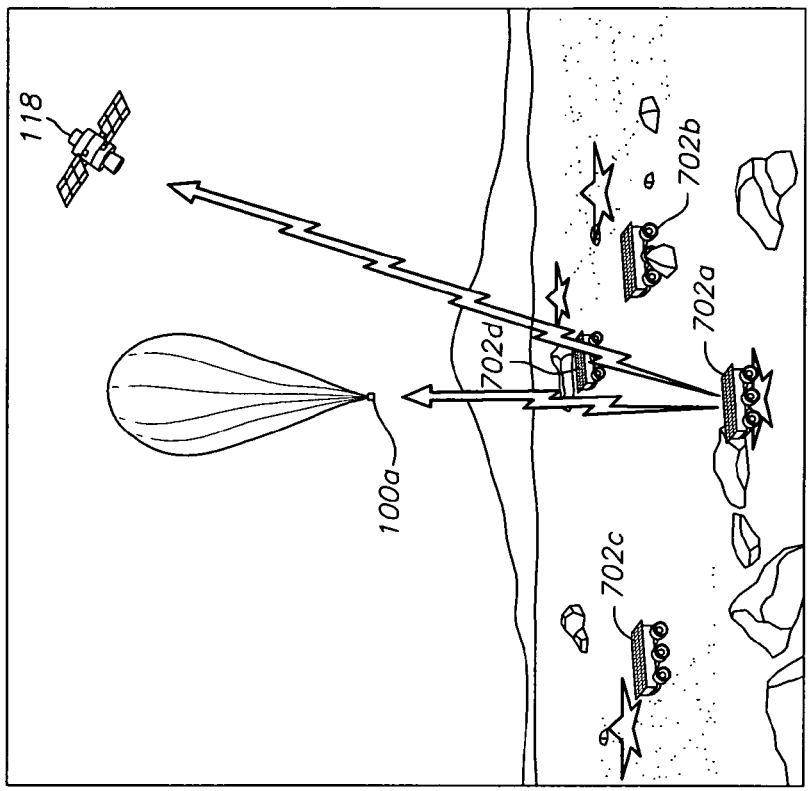
Figure 12I:
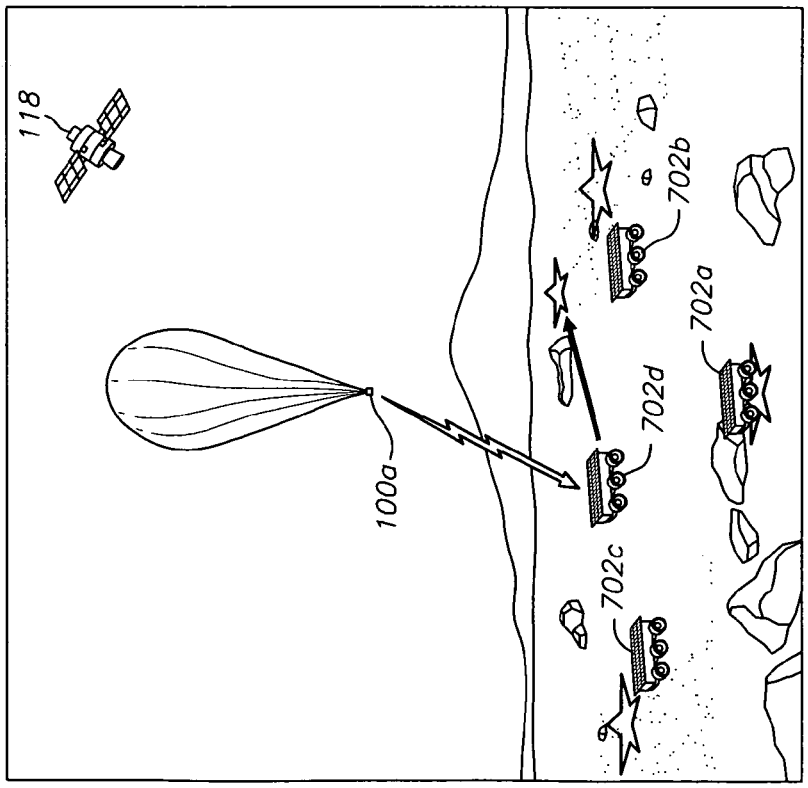
Figure 12L:
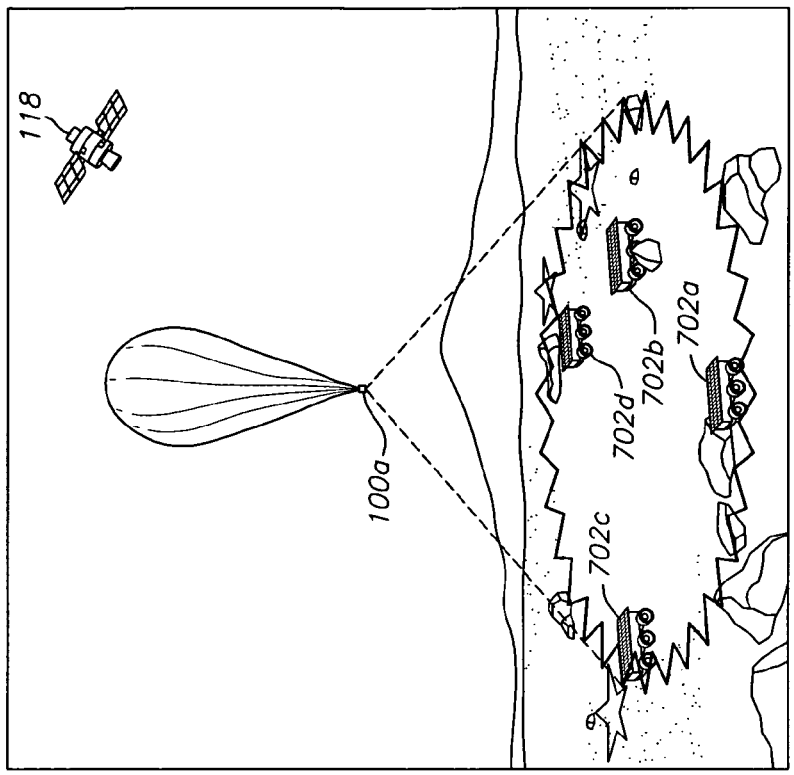
Figure 12K:
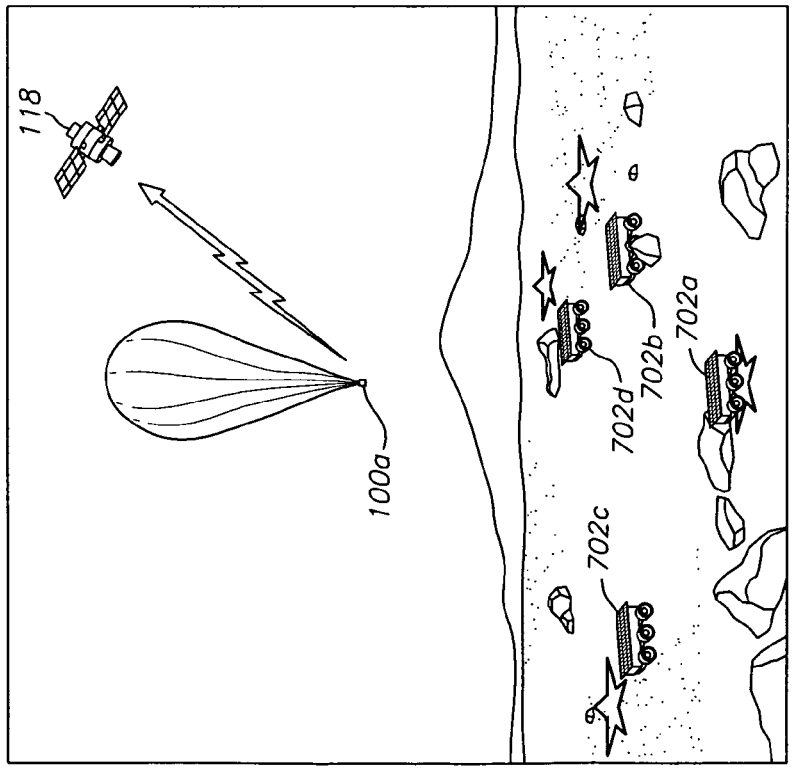
Figure 12N:
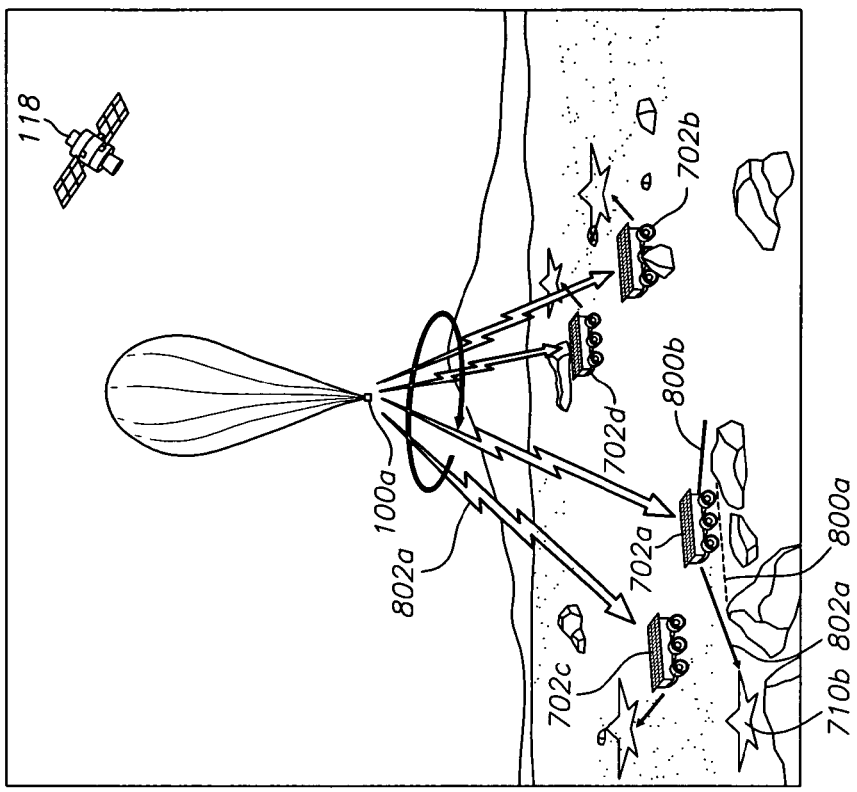
Figure 12M:
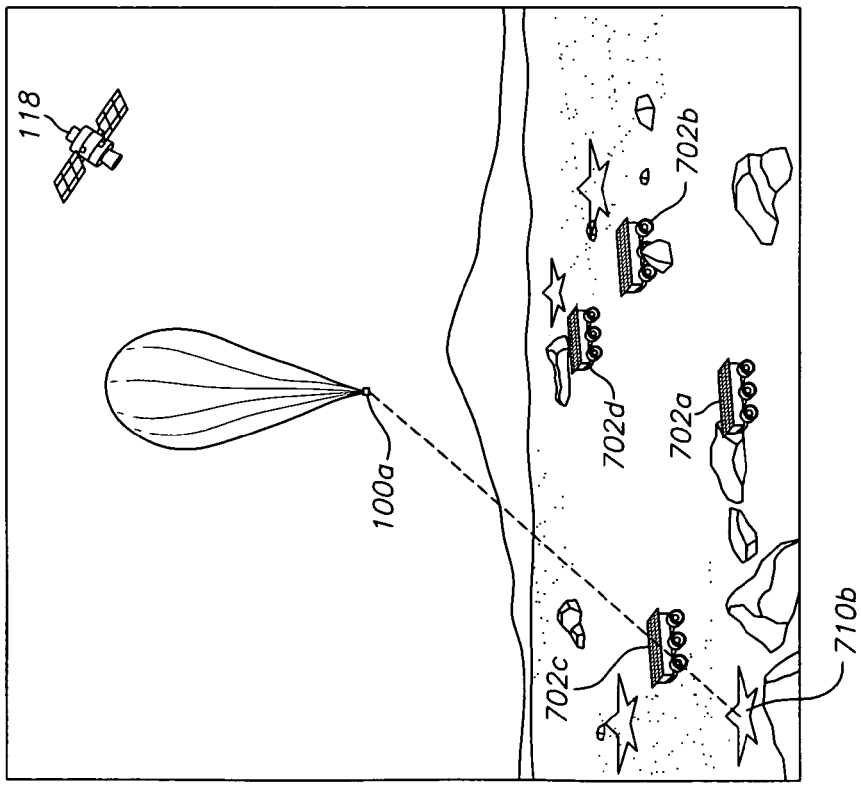
Figure 12P:
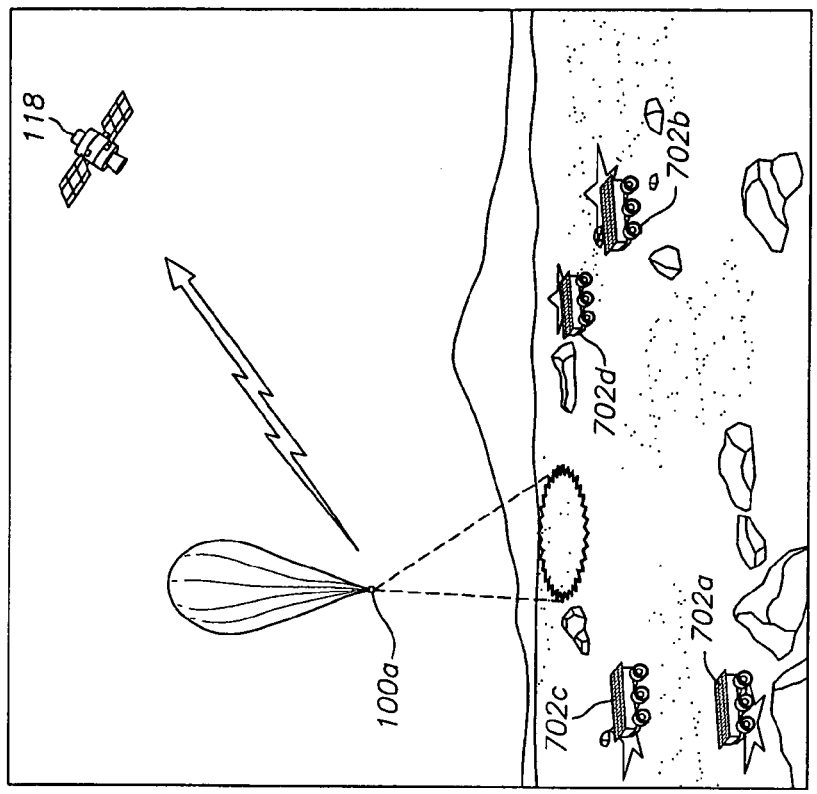
Figure 12O:
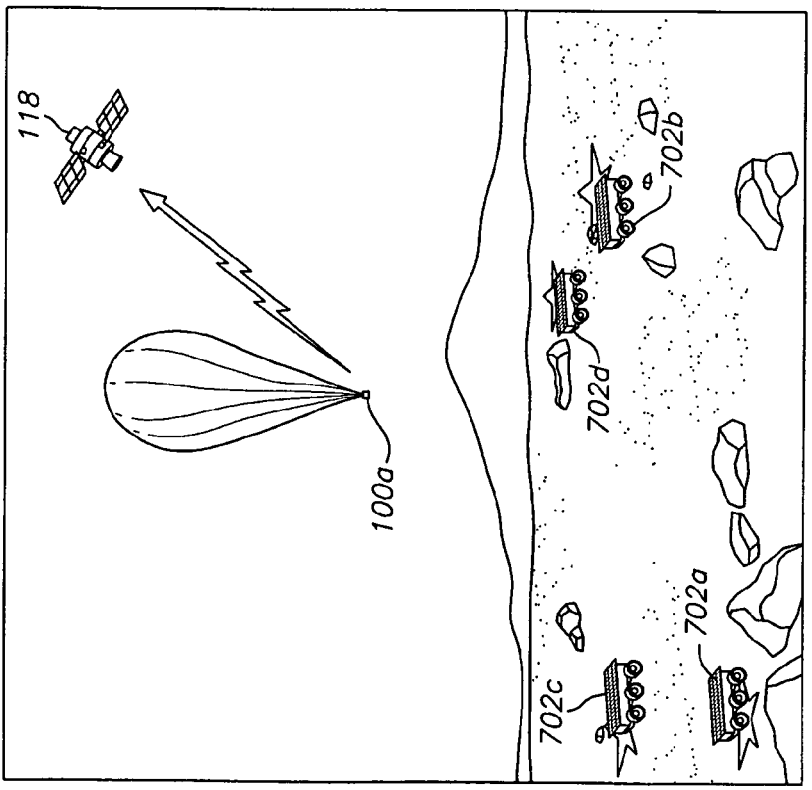
Figure 12Q:
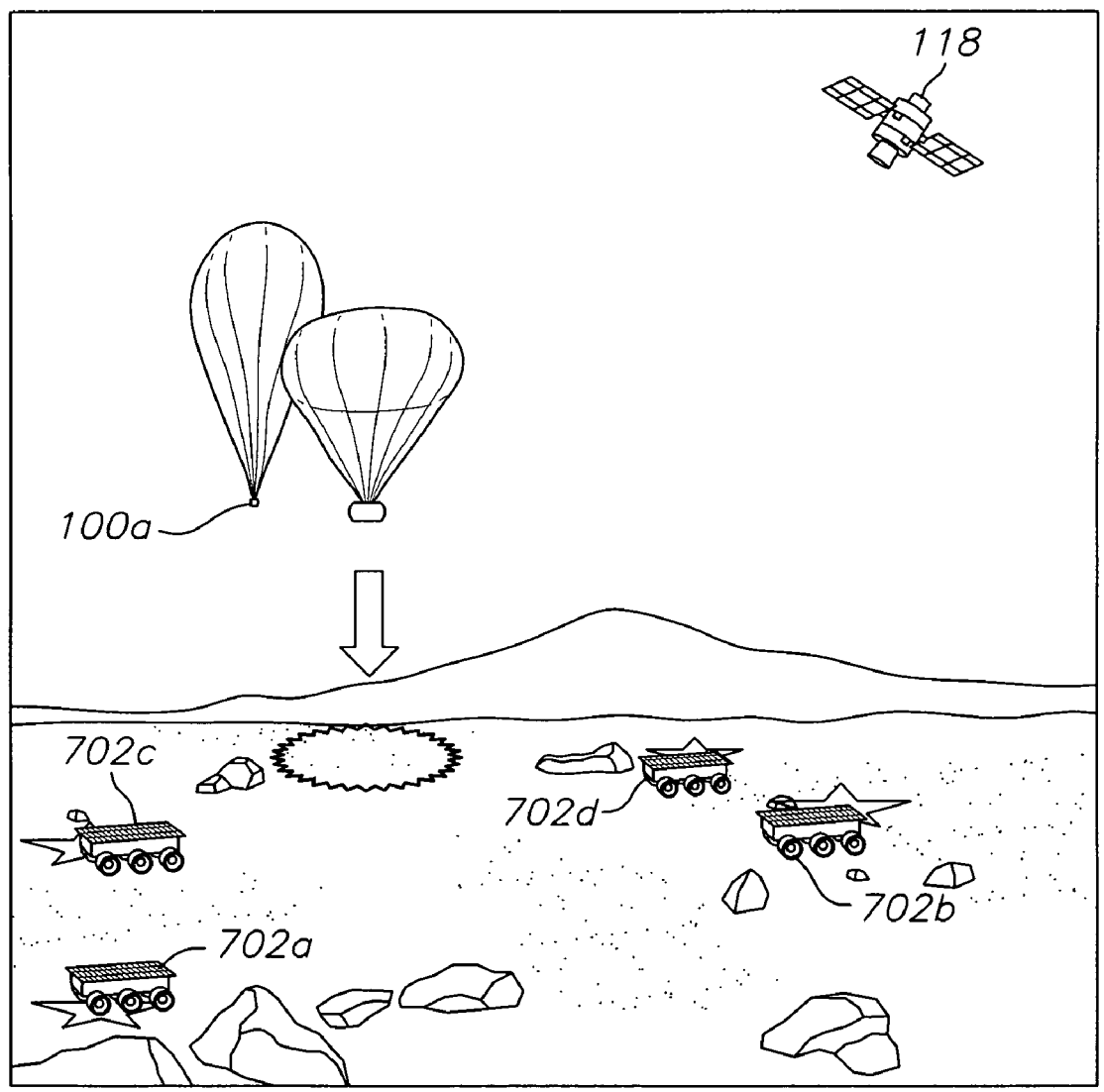
Figure 13:
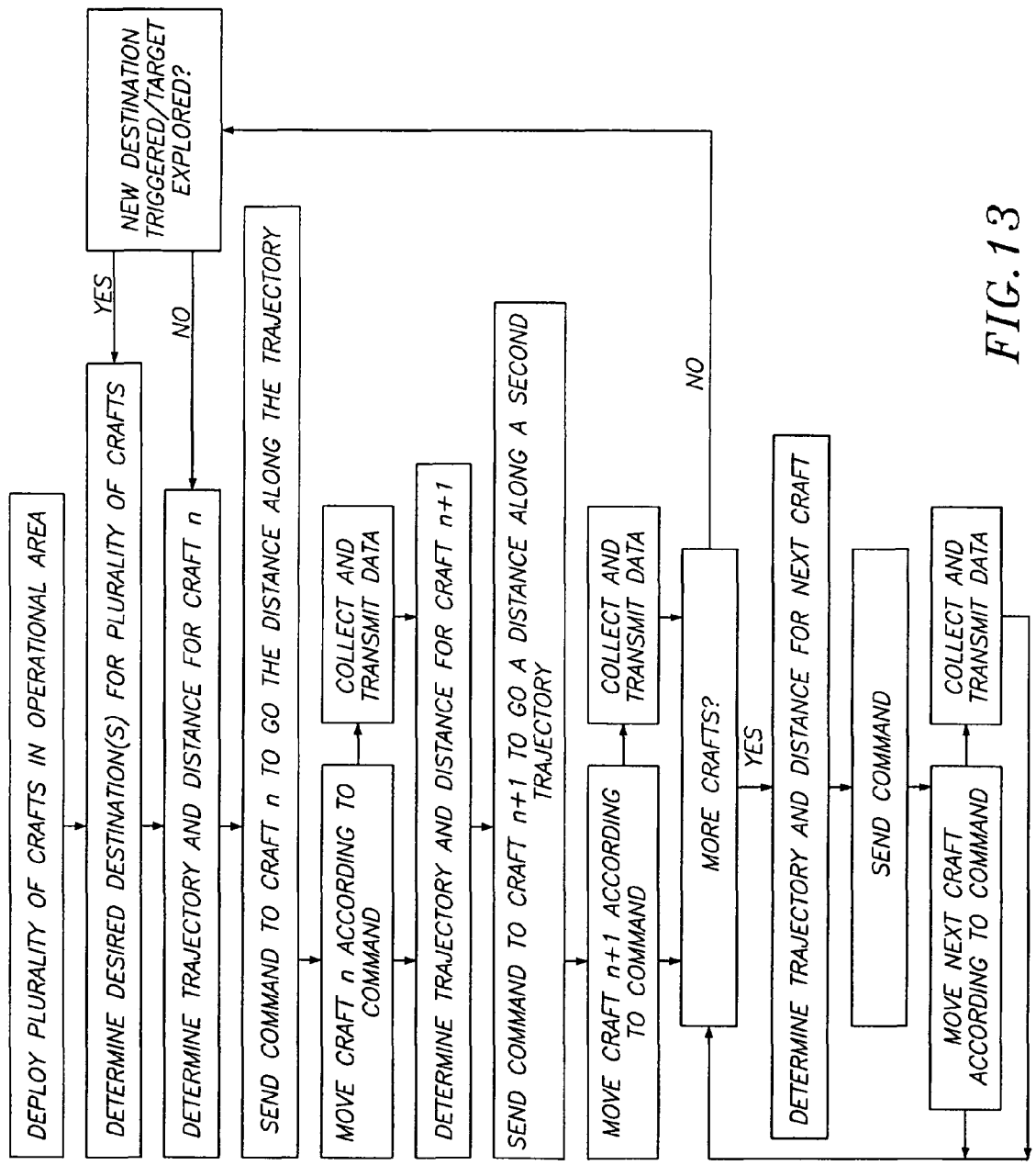
FIG. 13 is a process flow diagram of a method of controlling a plurality of crafts according to one embodiment of the present invention.

Rather than moving multiple crafts in the operational area simultaneously, each craft can be commanded or moved sequentially, as shown in FIGS. 12*a*-12*q* and 13. A satellite orbiter 118 sends a command to an airborne command system 100*a* to move to a desired operational area (FIG. 12*a*). The airborne command system 100*a* moves to the operational area according to the command and drops a plurality of crafts onto the surface of the operational area (FIG. 12*b*). Crafts 702*a*, 702*b*, 702*c*, and 702*d* are then deployed into the operational area (FIG. 12*c*). The satellite orbiter 118 then sends a command to the airborne command system 100*a* to scout out particular areas of interest and determine desired destinations for the plurality of crafts 702*a*, 702*b*, 702*c*, and 702*d* (FIG. 12*d*-12*e*). The airborne command system 100*a* determines a path segment 800*a* for the craft 702*a* to move toward the desired destination 710*a*, as discussed above, and sends this command to the first craft 702*a*. The first craft 702*a* then moves according to the command (FIG. 12*f*).

The airborne command system 100*a* determines a path segment 1800*a* for a second craft 702*b* to move toward its desired destination 1710*a*, and sends this command to the second craft 702*b* (FIG. 12*g*). In this embodiment, the desired destinations of the crafts 702*a* and 702*b* are different, but it is also within the scope of the invention for the desired destinations to be the same. The second craft 702*b* then moves according to the command. As shown in FIG. 12*h*, the path segment 1800*a* does not constitute the total distance to the desired destination 1710*a*. It is also within the scope of the invention, however, for the path segment 1800*a* to constitute the total distance to the desired destination 1710*a*.

The airborne command system continues to command each of the remaining crafts 702*c* and 702*d* to move along path segments toward their respective destinations. Each of the remaining crafts is then moved sequentially. The path segments may constitute the entire distance to the desired destination, or they may be a certain distance toward the desired destination along a certain path trajectory (FIGS. 12*h*-12*i*).

After all of the crafts are moved, the crafts can transmit a location or "target reached" signal as well as gathered science data to the command system 100*a* or to the satellite 118, or the command system 100*a* and/or satellite 118 can image the operational area as described above to determine the location of the crafts (FIGS. 12*j*-12*l*). If each of the crafts have arrived at their desired destinations, they may proceed sensing information about the target and transmitting the information to the command system and/or to the satellite. The command system 100*a* and/or the satellite 118 may then determine a new set of targets or desired destinations for each of the crafts (FIG. 12*m*).

If the location of the first craft is determined to be different than expected, for example the first craft traveled along path 800*b* instead of 800*a*, the airborne command system redetermines a path segment 802*a* from the first craft's actual location toward the desired destination, as described in relation to FIG. 7*c*. The command system then sends the command to the first craft 702*a* to move along path segment 802*a* toward the desired destination 710*b* (FIG. 12*n*).

The command system commands each of the remaining crafts 702*b*-702*d* to move along path segments toward their respective targets, and the crafts are then moved sequentially according to the commands. This method greatly limits the possibility of collisions between the crafts and simplifies path planning.

Characteristics of the operational area or objects within the operational area can be detected by any of the crafts, the command system, the satellite, or any other agent in communication with the multi-agent autonomous system. In one embodiment, the characteristics are transmitted from a craft to the command system or the satellite and/or directly to another craft. The crafts may also function as a second, additional layer of command systems to command movement of other crafts.

The redetermination of the path segments may be triggered by detection of those characteristics, such as the actual location of the craft, as described above. Other spatial characteristics that may trigger the redetermination are, for example, a feature of the operational area, or a feature of an object in the operational area, such as an obstacle or another craft. The feature can be movement of the object, a difference between the object and the operational area, a composition of the object, a location of the object, etc. The detected characteristic may also be temporal, such as a certain amount of time passing or a specific, predetermined time.

The redetermination of the path segments may also be triggered by detection of an anomaly such as a transient event or unique object sensed in the operational area. The craft, command system, or satellite, for example, can sense information about the operational area and compare it to a dataset of previously collected data, expected data, data from a different operational area, or other portions of the sensed information. If the data comparison results in an anomaly, for example, a certain deviation from the expected information, the surrounding environment, or previous readings, a new path segment can be determined to collect more information about the anomaly, tag its location, or maneuver around it.

Once all of the intended targets have been fully explored, the command system sends an "all done" signal to the satellite, which sends back a command for a new operational area to be explored (FIGS. 12*o*-12*p*). The process is then repeated until all operational areas have been explored (FIG. 12*q*).

Figure 9:
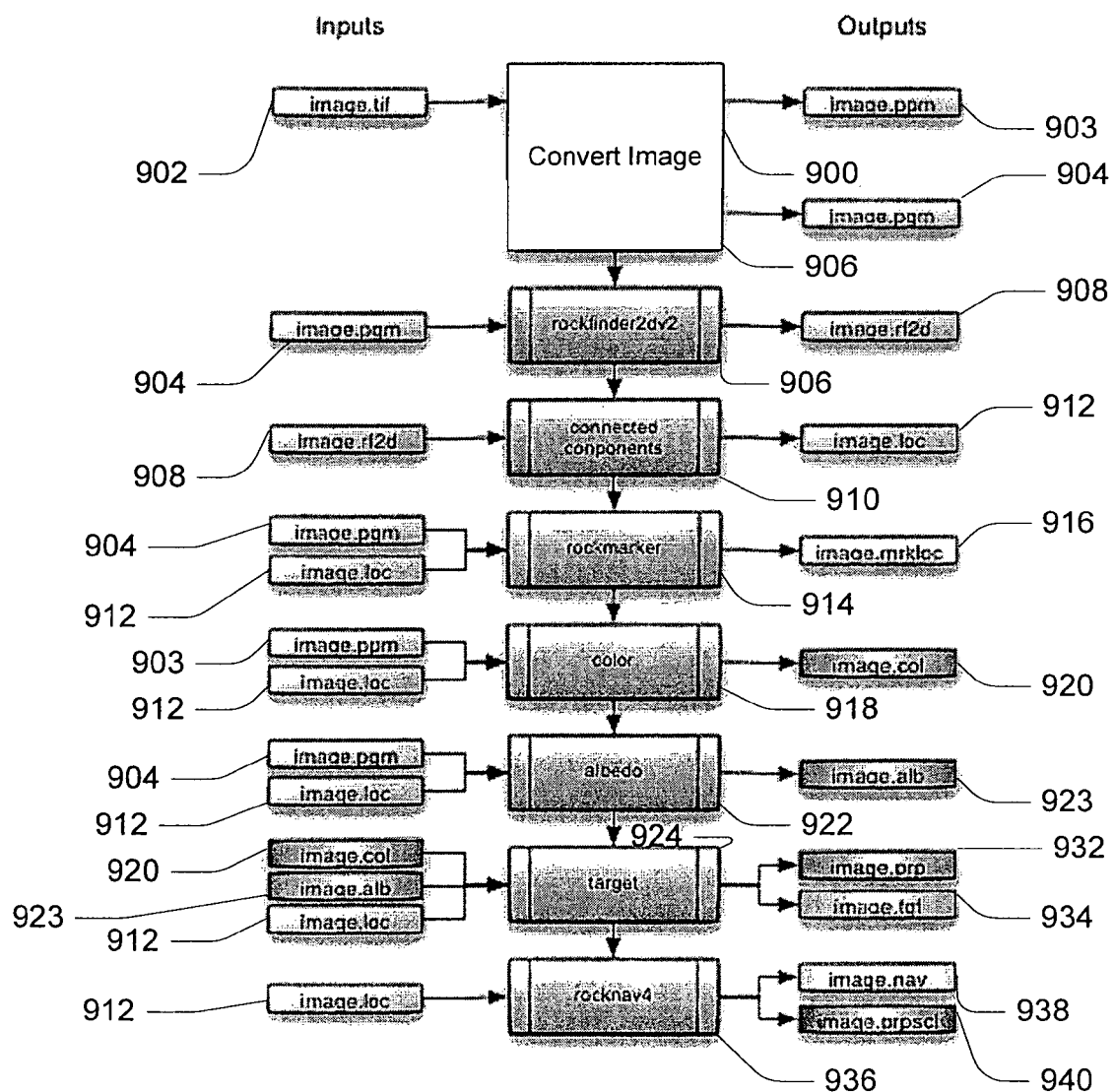
FIG. 9 is a process flow diagram of an image processing system in accordance with an exemplary embodiment of the present invention.

FIG. 9 is a process flow diagram of an image processing system in accordance with an exemplary embodiment of the present invention. A tracking and command system processes images from its instrument suite to determine a path for a craft. The tracking and command system does so by receiving an image and extracting information from the image in a sequence of passes, saving intermediate results in a temporary datastore. In a first pass, the tracking and command system converts (900) an input file image 902 into an image file 903 including color information and an image file 904 wherein the colors have been mapped to a grayscale. The tracking and command system then extracts (906) feature information 908 from the grayscale image file. The tracking and command system uses the feature information to identify (910) obstacles and targets and extract locations 912 of the obstacles and targets. The tracking and command system then uses the image file and the locations to generate (914) a mark feature file 916 of features that the tracking and command system may find to be interesting.

The tracking and command system next uses the image file and the location file to generate (918) a color file 920 wherein the color of each object, such as obstacles or targets, (including unexpected characteristics/anomalies), is indicated. The tracking and command system uses the image file and the location file to generate (922) an albedo file wherein the albedo of each object, such as obstacles or targets, is indicated.

The image file, color file, and albedo file are used by the tracking and command system to generate (924) a target image file 932 and a target file 934. The location file is finally used to generate (936) a navigation file 938 and a science target file 940 for use in determining a path for a craft.

Algorithms for extracting features from an image, including extracting the position and heading of a man-made object in a natural environment, are well known in the art of robotics. Each algorithm has its own advantages and weaknesses. As such, multi-agent autonomous systems in accordance with exemplary embodiments of the present invention may include different feature extraction algorithms dependent on the needs of a researcher or explorer (or the needs of an industrial exploration, military mission, rescue mission, hazardous clean-up mission, etc.).

In one multi-agent autonomous system in accordance with an exemplary embodiment of the present invention, operational area analysis is performed by a suite of image processing programs entitled "Automated Geologic Field Analyzer" developed in part at the Jet Propulsion Laboratory of the California Institute of Technology, Pasadena, Calif., discussed in Fink, et al, *AGFA: (Airborne) Automated Geologic Field Analyzer*, Symposium SS-56: "New results from the robotic exploration of Mars and Titan and their implications on planetary environmental conditions and cosmochemistry" in *Abstracts of the 15$^{th}$ Annual V. M. Goldschmidt Conference, Moscow, Id. Geochimica et Cosmochimica Acta*, Volume 69, Number 10S, A535 (2005). In addition, craft tracking can be performed using a neural network using, for example, adaptive Radial Basis Functions (RBFs) for target recognition and tracking as described in "Real-time automatic target recognition using a compact 512×512 grayscale optical correlator, T. Chao, H. Zhou, G. F. Reyes, J. Hanan; Proceedings of SPIE Vol. #5106, the contents of which are hereby incorporated by reference as if stated fully herein.

Figure 10:
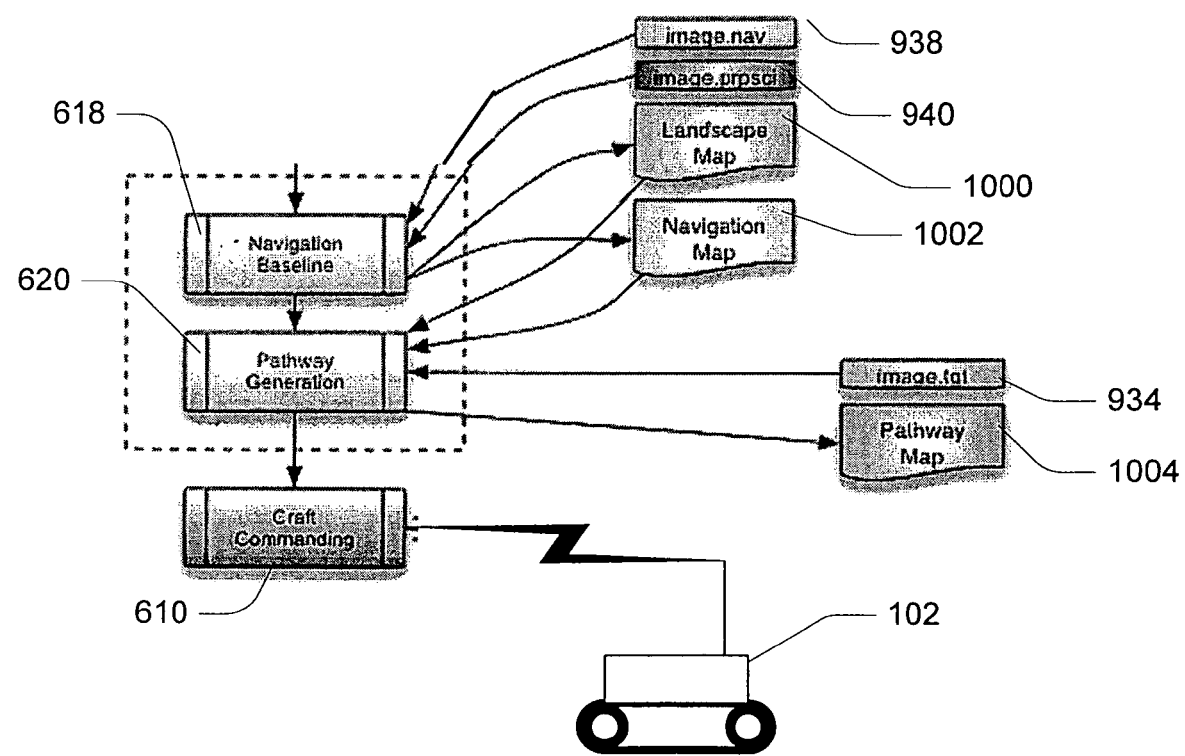
FIG. 10 is a process flow diagram of a craft command process in accordance with an exemplary embodiment of the present invention.

FIG. 10 is a process flow diagram of a craft command process in accordance with an exemplary embodiment of the present invention. A tracking and command system uses a craft command process to generate paths for crafts deployed in an operational area. From the paths, specific craft commands are generated. To generate a path, a navigation baseline process 618 receives a navigation file 938 and science goal file 940 generated in the previously described image processing process of FIG. 9. The navigation baseline process generates a landscape map 1000 and a navigation map 1002. A pathway generation process 620 uses the landscape map, the navigation map, and the target file 934 to generate a pathway map 1004. From the pathway map, individual craft commands are generated that are transmitted to a craft 102 in a craft commanding process 610.

Algorithms for determining paths for a robot in an accurately characterized environment are well known in the art of robotics. Each algorithm has its own advantages and weaknesses. As such, multi-agent autonomous systems in accordance with exemplary embodiments of the present invention may include different path finding algorithms dependent on the needs of a researcher or explorer. In one multi-agent autonomous system in accordance with an exemplary embodiment of the present invention, path finding is performed using a line intersection method. Other algorithms may include weighted graph algorithms, the well-known A* method, etc.

Figure 11:
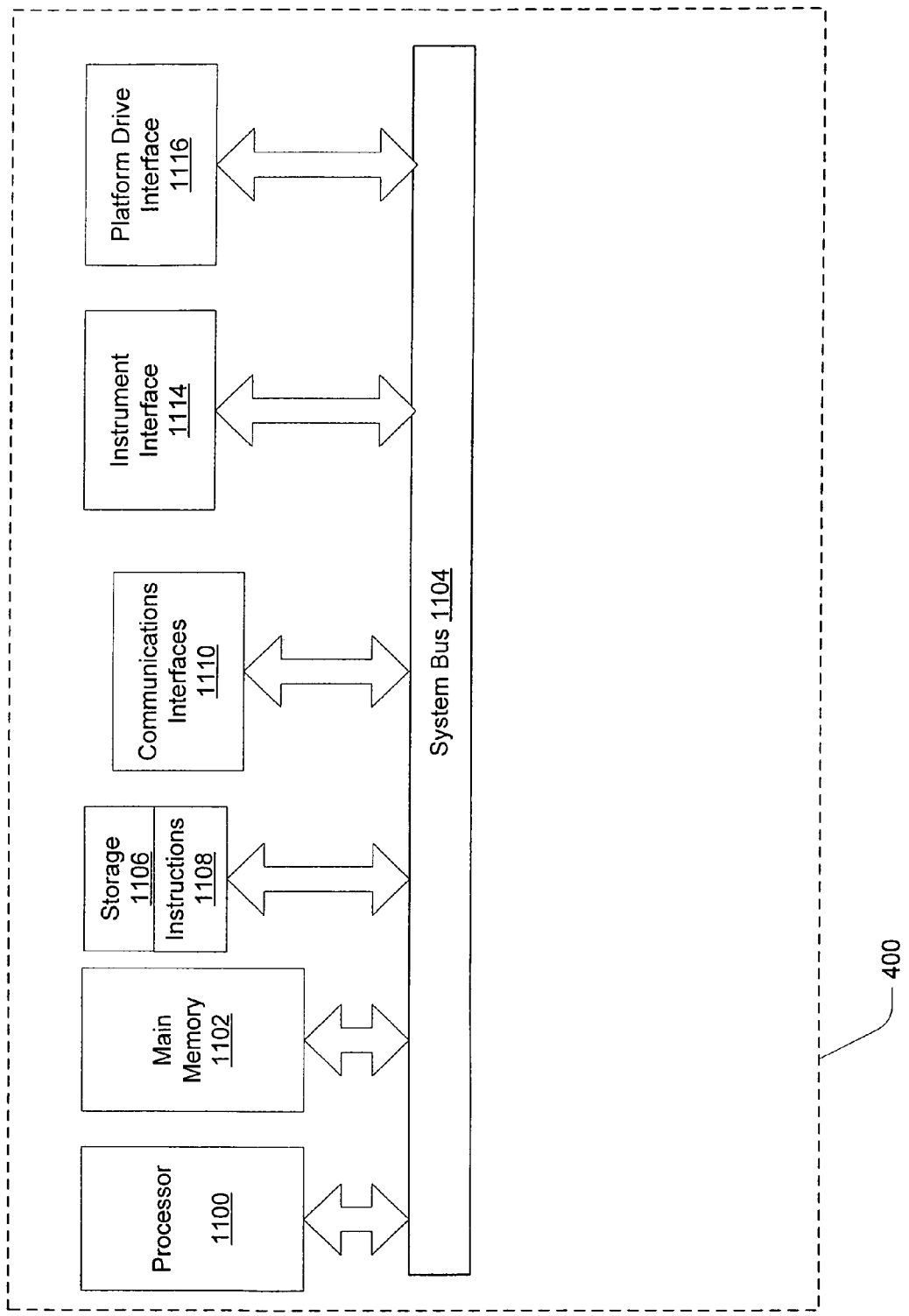
FIG. 11 is an architecture diagram of a data processing apparatus suitable for use as a craft tracking and command system in accordance with an exemplary embodiment of the present invention.

FIG. 11 is an architecture diagram of a data processing apparatus suitable for use as a craft tracking and command system controller in accordance with an exemplary embodiment of the present invention. The data processing apparatus 400 includes a processor 1100 coupled to a main memory 1102 via a system bus 1104. The processor is also coupled to a data storage device 1106 via the system bus. The storage device includes programming instructions 1108 implementing the features of a tracking and command system as described above. In operation, the processor loads the programming instructions into the main memory and executes the programming instructions to implement the features of the tracking and command system.

The data processing system may further include a plurality of communications device interfaces 1110 coupled to the processor via the system bus. A tracking and command system controller, hosted by the data processing system, uses the communications device interfaces to communicate with surface-bound craft, satellite, or other airborne agents/tracking and command systems as previously described.

The data processing system may further include an instrument interface 1114 coupled to the processor via the system bus. A tracking and command system controller, hosted by the data processing system, uses the instrument interface to generate control signals for a tracking and imaging instrument suite as previously described. In addition, the instrument interface is used by the tracking and command system controller to receive instrument suite sensor signals such as images of the operational area.

The data processing system may further include a platform drive interface 1116 coupled to the processor via the system bus. A tracking and command system controller, hosted by the data processing system, uses the platform drive interface to generate control signals for a platform supporting the tracking and command system.

Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by any claims supported by this application and the claims' equivalents rather than the foregoing description.

What is claimed is:

1. A method of controlling a plurality of crafts in an operational area, the method comprising:
providing a command system;
providing a first craft in the operational area and coupled to the command system;
providing a second craft in the operational area and coupled to the command system;
determining a first desired destination and a first trajectory to the first desired destination;
sending a first command from the command system to the first craft to move a first distance along the first trajectory;
moving the first craft according to the first command;
sensing of the operational area by the first craft to obtain sensing information;
transmitting the sensing information to the command system;
determining a second desired destination and a second trajectory to the second desired destination; and
sending a second command from the command system to the second craft to move a second distance along the second trajectory.

2. The method of claim 1, wherein the second command is sent after sending the first command.

3. The method of claim 1, wherein the first distance is shorter than a distance of the first trajectory to the first desired destination.

4. The method of claim 1, wherein the second distance is shorter than a distance of the second trajectory to the second desired destination.

5. The method of claim 1, wherein the first desired destination is the same as the second desired destination.

6. The method of claim 1, wherein the first desired destination is different from the second desired destination.

7. The method of claim 1, wherein the command system is in the operational area.

8. The method of claim 1, wherein the command system is outside of the operational area.

9. The method of claim 1, wherein the first craft is at least one of ground-based, subsurface-based, airborne, spaceborne, or waterborne.

10. The method of claim 1, further comprising:
providing a third craft in the operational area and coupled to at least one of the command system, the first craft, or the second craft;
determining a third desired destination and a third trajectory to the third desired destination;
sending a third command from the at least one of the command system, the first craft, or the second craft to the third craft to move a third distance along the third trajectory;
moving the third craft according to the third command.

11. The method of claim 10, further comprising determining a third trajectory.

12. The method of claim 11, wherein the third trajectory is the same as the first trajectory.

13. The method of claim 11, wherein the third trajectory is different from the first trajectory.

14. The method of claim 11, wherein the determining of the third trajectory is based on the determined location of the first craft, and the third trajectory is toward the first desired destination.

15. The method of claim 11, further comprising determining a third desired destination, and wherein the third trajectory is a trajectory to the third desired destination.

16. The method of claim 11, further comprising sending a fourth command from the command system to the first craft to move a fourth distance along a fourth trajectory.

17. The method of claim 11, further comprising detecting a characteristic, wherein the determining of the third trajectory is triggered by the detection of the characteristic.

18. The method of claim 17, wherein the detecting the characteristic is by at least one of the first craft, the second craft, or the command system.

19. The method of claim 17, wherein the characteristic is temporal.

20. The method of claim 17, wherein the characteristic is spatial.

21. The method of claim 17, wherein the characteristic is a location of the first craft.

22. The method of claim 17, wherein the characteristic is a feature of the operational area.

23. The method of claim 17, wherein the characteristic is a feature of an object in the operational area.

24. The method of claim 23, wherein the object is an obstacle.

25. The method of claim 23, wherein the feature is movement of the object.

26. The method of claim 23, wherein the feature is a difference between the object and the operational area.

27. The method of claim 23, wherein the feature is a composition of the object.

28. The method of claim 23, wherein the feature is a location of the object.

29. The method of claim 11, further comprising:
providing a first dataset of information;
comparing the sensing information to the first dataset to detect an anomaly,
wherein the determining of the third trajectory is triggered by detection of the anomaly.

30. The method of claim 29, wherein the first dataset of information comprises information sensed from the operational area at a previous time.

31. The method of claim 29, wherein the first dataset of information comprises information sensed from a different operational area.

32. The method of claim 29, wherein the first dataset of information comprises information expected to be sensed from the operational area.

33. The method of claim 29, wherein the anomaly is a difference between the first dataset and the sensing information.

34. The method of claim 29, wherein further sensing of the operational area is performed by at least one of the second craft, the third craft, or the command system.

35. The method of claim 1, further comprising moving the second craft according to the second command after moving the first craft according to the first command.

36. The method of claim 35, further comprising determining a location of the second craft after moving the second craft according to the second command.

37. The method of claim 1, further comprising determining a location of the first craft after moving the first craft according to the first command.

38. The method of claim 1, further comprising determining a third trajectory for the first craft by the command system at least in part based on the sensing information.

39. The method of claim 38, further comprising sending a third command to the first craft to move a third distance along the third trajectory.

40. The method of claim 1, wherein the command system floats above the operational area.

41. A method of controlling a plurality of crafts in an operational area, the method comprising:
providing a command system;
providing a first craft in the operational area and coupled to the command system;
providing a second craft in the operational area and coupled to the command system;
providing a third craft in the operational area and coupled to the first craft, the second craft, or both;
determining a first desired destination and a first trajectory to the first desired destination;
sending a first command from the command system to the first craft to move a first distance along the first trajectory;
moving the first craft according to the first command;
determining a second desired destination and a second trajectory to the second desired destination;
sending a second command from the command system to the second craft to move a second distance along the second trajectory;
determining a third desired destination and a third trajectory to the third desired destination;
sending a third command from the first craft, the second craft, or both to the third craft to move a third distance along the third trajectory;
moving the third craft according to the third command.

* * * * *